US012704628B2

(12) United States Patent
Ai et al.

(10) Patent No.: US 12,704,628 B2
(45) Date of Patent: Aug. 11, 2026

(54) ACCURATE GAS LEAK DETECTION USING TUNEABLE DIODE LIDAR SYSTEMS

(71) Applicant: QLM Technology Ltd, Paignton (GB)

(72) Inventors: Xiao Ai, Bristol (GB); James Graham Titchener, Bristol (GB); Murray Keith Reed, Paignton (GB)

(73) Assignee: QLM Technology Ltd, Paignton (GB)

( * ) Notice: Subject to any disclaimer, the term of this patent is extended or adjusted under 35 U.S.C. 154(b) by 51 days.

(21) Appl. No.: 18/954,416

(22) Filed: Nov. 20, 2024

(65) Prior Publication Data

US 2026/0140258 A1 May 21, 2026

(51) Int. Cl.
*G01S 17/04* (2020.01)
*G01S 7/481* (2006.01)
(Continued)

(52) U.S. Cl.
CPC ............ *G01S 17/04* (2020.01); *G01S 7/4813* (2013.01); *G01S 7/4817* (2013.01); *G01S 7/484* (2013.01);
(Continued)

(58) Field of Classification Search
CPC ...... G01S 17/04; G01S 7/4813; G01S 7/4817; G01S 7/484; G01S 7/4865; G01S 17/10; G01S 17/89
See application file for complete search history.

(56) References Cited

U.S. PATENT DOCUMENTS

| | | | |
|---|---|---|---|
| 5,339,155 | A | 8/1994 | Partridge et al. |
| 8,121,798 | B2 | 2/2012 | Lippert et al. |

(Continued)

FOREIGN PATENT DOCUMENTS

| | | | |
|---|---|---|---|
| GB | 2586075 | B | 7/2021 |
| GB | 2607646 | B | 11/2023 |

(Continued)

OTHER PUBLICATIONS

Baumgartner et al., "Continuously tunable ir lidar with applications to remote measurements of SO2 and CH4", Optical Society of America, Applied Optics, Nov. 15, 1978, vol. 17, No. 22, pp. 3555-3561.

(Continued)

*Primary Examiner* — Isam A Alsomiri
*Assistant Examiner* — Sanjida Naser
(74) *Attorney, Agent, or Firm* — Haynes Beffel & Wolfeld LLP; Andrew L. Dunlap; Franklin M. Schellenberg

(57) ABSTRACT

When using spectroscopic diode lidar to detect a gas of interest such as methane ($CH_4$), detecting high concentration pathlength (CPL) values of the gas of interest may not actually indicate a plume or leak. In areas such as a refinery, where ambient gas levels may be routinely high, absorption from ambient gas measured over a long pathlength may produce the same CPL value as a much closer gas leak, leading to a false positive. By collecting and using lidar distance information in tandem with the CPL values determined from the lidar system spectroscopic measurements, the statistical properties of the dataset can be evaluated, and ambient concentrations of the gas estimated. A lidar dataset with revised values of CPL that adjusts for these measurements of ambient concentration may be created to provide better reliability for analysis and in for triggering alarms for potentially dangerous gas concentrations and leaks.

20 Claims, 12 Drawing Sheets

(51) Int. Cl.

| | |
|---|---|
| ***G01S 7/484*** | (2006.01) |
| ***G01S 7/4865*** | (2020.01) |
| ***G01S 17/10*** | (2020.01) |
| ***G01S 17/89*** | (2020.01) |

(52) U.S. Cl.

CPC ............ *G01S 7/4865* (2013.01); *G01S 17/10* (2013.01); *G01S 17/89* (2013.01)

(56) References Cited

U.S. PATENT DOCUMENTS

| | | | | |
|---|---|---|---|---|
| 9,970,756 | B2 | 5/2018 | Kreitinger et al. | |
| 11,644,576 | B2 | 5/2023 | Ai et al. | |
| 11,714,047 | B2 | 8/2023 | Ai et al. | |
| 11,940,817 | B2 | 3/2024 | Kreitinger et al. | |
| 12,099,007 | B2 | 9/2024 | Ai et al. | |
| 12,111,335 | B2 | 10/2024 | Reed et al. | |
| 12,123,830 | B2 | 10/2024 | Ai et al. | |
| 12,339,264 | B1 | 6/2025 | Lowndes et al. | |
| 2007/0061114 | A1 | 3/2007 | Kalayeh | |
| 2014/0002639 | A1 | 1/2014 | Cheben et al. | |
| 2017/0097274 | A1 | 4/2017 | Thorpe et al. | |
| 2018/0209902 | A1* | 7/2018 | Myshak | G01J 3/42 |
| 2019/0178974 | A1 | 6/2019 | Droz | |
| 2022/0082495 | A1 | 3/2022 | Kreitinger et al. | |
| 2022/0137192 | A1* | 5/2022 | Yin | G01S 7/4865 356/4.01 |
| 2022/0244179 | A1 | 8/2022 | Ai et al. | |
| 2022/0390360 | A1 | 12/2022 | Ai et al. | |
| 2022/0390361 | A1 | 12/2022 | Ai et al. | |
| 2022/0390365 | A1 | 12/2022 | Ai et al. | |
| 2022/0390566 | A1 | 12/2022 | Ai et al. | |
| 2022/0397672 | A1 | 12/2022 | Ai et al. | |
| 2023/0052690 | A1* | 2/2023 | Tsuchida | G01S 17/58 |
| 2023/0161042 | A1 | 5/2023 | Ai et al. | |
| 2023/0221219 | A1 | 7/2023 | Thorpe et al. | |
| 2023/0243648 | A1 | 8/2023 | Kreitinger et al. | |
| 2023/0324430 | A1* | 10/2023 | Reed | G01P 5/26 73/170.11 |
| 2024/0192131 | A1 | 6/2024 | Ai et al. | |

FOREIGN PATENT DOCUMENTS

| | | | |
|---|---|---|---|
| GB | 2617370 | B | 12/2024 |
| WO | 2019013698 | A1 | 1/2019 |
| WO | 2019099567 | A1 | 5/2019 |
| WO | 2023194158 | A1 | 10/2023 |

OTHER PUBLICATIONS

Chambers et al., "Direct Measurement of Fugitive Emissions of Hydrocarbons from a Refinery", Journal of the Air & Waste Management Association, Aug. 2008, vol. 58, No. 8, pp. 1047-1056, doi: 10.3155/1047-3289.58.8.1047.

Sandsten et al., "Real-time gas-correlation imaging employing thermal background radiation" Optics Express vol. 6, No. 4 Feb. 14, 2000 pp. 92-103.

Herbert J. Kramer, "MERLIN (Methane Remote Sensing Lidar Mission)," Last updated Oct. 20, 2012, from website Earth Observation Portal (EOPortal), www.eoportal.org/satellite-missions/merlin, accessed on Sep. 25, 2024.

Golston et al., "Lightweight mid-infrared methane sensor for unmanned aerial systems", Applied Physics B Lasers and Optics, May 19, 2017, vol. 123, No. 170, pp. 1-9, doi: 10.1007/s00340-017-6735-6.

Wainner et al., "Scanning, standoff TDLAS leak imaging and quantification", Next-Generation Spectroscopic Technologies X, SPIE, vol. 10210, 1021006, Jun. 13, 2017, doi: 10.1117/12.2264799, 11 pages.

Wang et al., "Machine vision for natural gas methane emissions detection using an infrared camera", Applied Energy, vol. 257, 113998, Oct. 13, 2019, 10 pages.

Titchener et al., "Single photon Lidar gas imagers for practical and widespread continuous methane monitoring", Applied Energy, vol. 306, 118086, Oct. 31, 2021, 11 pages.

Gålfalk et al., "Making methane visible", Nature Climate Change, Nov. 30, 2015, pp. 1-5, doi: 10.1038/NCLIMATE2877.

Ai et al., "Analysis of a random modulation single photon counting differential abosrptio lidar system for space-borne atmospheric CO2 sensing", The Optical Society, Optics Express vol. 24, No. 18, Sep. 5, 2016, pp. 21119-21133, doi: 10.1364/OE.24.021119.

Ai et al., "High-resolution random-modulation cw lidar", Optical Society of America, Applied Optics, vol. 50, No. 22, Jul. 28, 2011, pp. 4478-4488.

Li et al., "Single-photon imaging over 200 km", Optica, vol. 8, No. 3, Mar. 9, 2021, pp. 344-349.

Nagasawa et al. "Random Modulation cw lidar using new random sequence" Applied Optics vol. 29 No. 10, Apr. 1, 1990, pp. 1466-1470.

Pérez-Serrano et al., Atmospheric CO2 remote sensing system based on high brightness semiconductor lasers and single photon counting detection, Proc. SPIE 9645, Lidar Technologies, Techniques, and Measurements for Atmospheric Remote Sensing XI, 964503, Oct. 20, 2015, 11 pages (downloaded from https://www.spiedigitallibrary.org/conference-proceedings-of-spie on Oct. 20, 2023).

Rapp et al. "High-flux single-photon lidar", Optica vol. 8 No. 1, published Jan. 6, 2021, pp. 30-39, https://doi.org/10.1364/OPTICA.403190.

Shaw et al., "Methods for quantifying methane emissions using unmanned aerial vehicles: a review", Philosophical Transactions of the Royal Society A 379:20200450, May 12, 2021, 21 pages.

Takeuchi et al, Diode-laser random-modulation cw lidar, Applied Optics, vol. 25, No. 1, Jan. 1, 1986, p. 63-67.

X. Ai et al., "Pseudo-random Single Photon Counting for Space-borne Atmospheric Sensing Applications," 2014 IEEE Aerospace Conference, Big Sky, MT, USA, Mar. 2014, pp. 1-10, doi: 10.1109/AERO.2014.6836513.

* cited by examiner

ACCURATE GAS LEAK DETECTION USING TUNEABLE DIODE LIDAR SYSTEMS

RELATED APPLICATIONS

This application is related to the commonly owned U.S. patent application Ser. No. 17/615,790, filed Dec. 1, 2021, U.S. patent application Ser. No. 18/384,269, filed Oct. 26, 2023, and U.S. patent application Ser. No. 18/884,929, filed Sep. 13, 2024, all of which claim priority from PCT Application PCT/GB2020/051816, which in turn claims priority to GB Patent Application GB 1911081.6, filed Aug. 2, 2019, now issued as GB Patent GB 2586075 B; all of which are incorporated by reference herein in their entirety for all purposes.

This application is also related to the commonly owned U.S. patent application Ser. No. 17/659,763, filed Apr. 19, 2022, and its continuation U.S. patent application Ser. No. 18/827,528, filed Sep. 6, 2024, both of which in turn claim priority to GB Patent Application GB 2116372.0, filed Nov. 12, 2021, now issued as GB Patent GB 2607646 B; which claims the benefit of U.S. Provisional Application No. 63/202,378, filed Jun. 8, 2021, all of which are incorporated by reference herein in their entirety for all purposes.

This application is also related to the commonly owned U.S. patent application Ser. No. 17/805,937, filed Jun. 8, 2022, and its continuation U.S. patent application Ser. No. 17/811,223, filed on Jul. 7, 2022, both of which claim the benefit of U.S. Provisional Application No. 63/202,377, filed on Jun. 8, 2021, all of which are incorporated by reference herein in their entirety for all purposes.

This application is also related to the commonly owned U.S. patent application Ser. No. 17/663,102, filed May 12, 2022, which claims the benefit of U.S. Provisional Application No. 63/202,378 filed on Jun. 8, 2021, all of which are incorporated by reference herein in their entirety for all purposes.

This application is also related to the commonly owned U.S. patent application Ser. No. 17/806,039, filed Jun. 8, 2022, and its continuation U.S. patent application Ser. No. 17/811,317, filed Jul. 8, 2022, which both claim the benefit of U.S. Provisional Application No. 63/202,375, filed Jun. 8, 2021, all of which are incorporated by reference herein in their entirety for all purposes.

This application is also related to the commonly owned U.S. patent application Ser. No. 18/786,245, filed Jul. 26, 2024, which is incorporated by reference herein in its entirety for all purposes.

FIELD OF THE TECHNOLOGY DISCLOSED

The technology disclosed relates to the use of lidar to determine gas concentrations, and in particular using both gas concentration and distance measurements from a diode lidar system to more accurately determine the locations and local gas concentrations for a gas of interest, such as methane ($CH_4$).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

To monitor and control the release of greenhouse gases such as methane ($CH_4$), systems that can remotely detect the presence and concentration of these gases are installed in industrial settings such as refineries, along pipeline installations, or even deployed from aircraft or satellites.

However, if the results of these gas monitors are to be believed, they must produce accurate results. A false positive indicating a methane leak along a pipeline may initiate a costly repair operation, only for the crew to find the signal indicates a drifting breeze from a nearby animal facility. With the initiation of stricter regulation for methane releases in the European Union and the United States, inaccurate reporting of methane releases can have costly consequences for a company that in fact may be doing nothing wrong.

There is therefore a need for methods and systems to accurately determine whether a measured gas concentration is due to a leak when using remote sensing equipment for gas detection, particularly for environments where ambient gas concentrations can be significant.

BRIEF SUMMARY

The technology disclosed provides methods and systems for accurate analysis of measurements for remote gas detection, and in particular for gas detection using lidar.

Spectroscopic lidar equipment can provide laser light at wavelengths that are both “on” and “off” an absorption feature for a gas of interest. By determining the relative absorption by the gas, gas concentrations along the laser pathlength can be inferred. In some lidar systems, a spectrum of laser wavelengths may be provided to encompass an absorption feature for the gas of interest, allowing comparisons with absorption spectra profiles to better determined the gas concentration. When gas concentrations are anomalously high, they may be correlated to a gas leak from containers or pipelines, and flagged for attention and repair.

However, when detecting absorption for a gas such as methane ($CH_4$) in areas where ambient levels of such a gas may be routinely high, such as a refinery, high levels of the gas of interest being detected may not actually indicate a leak. The absorption from ambient gas measured over a long pathlength may produce the same concentration pathlength (CPL) value as the CPL for a nearby gas leak, measured using a shorter pathlength. If the distance to the lidar scattering sites is not taken into account, a false positive for a dangerous gas concentration may be identified, and an alarm for a leak may be raised in error.

Lidar systems were originally developed to measure distances to their targets, and so distance information to estimate the laser pathlength can be determined by most lidar systems. By collecting and using this distance information in tandem with the gas concentration values determined from the lidar system spectroscopic measurements, ambient concentrations of the gas can be estimated. Calculations of CPL that are adjusted for these measurements of ambient concentration provide better reliability when used to flag anomalous and potentially dangerous gas concentrations and possible leaks.

The techniques disclosed herein may be used in the detection any gas of interest, but may be particularly useful for detection of methane ($CH_4$) which has an absorption feature at approximately $\lambda$=1651 nm, coincident with commercially available diode lasers.

Particular aspects of the technology disclosed are described in the claims, specification and drawings.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

The following detailed description is made with reference to FIGS. 1-12. Exemplary implementations are described to illustrate the technology disclosed, not to limit its scope, which is defined by the claims. Those of ordinary skill in the art will recognize a variety of equivalent variations on the description that follows.

Tuneable Diode Lidar

Lidar systems for detecting distances to objects in a scene or landscape have been deployed as a remote sensing technique since shortly after the invention of the laser. In a typical lidar system, a light is sent from a source to a scene or distant object, and the backscattered signal from objects in various positions in the scene can be detected. The time-of-flight $t_{2d}$ between transmitting the light, scattering off the distant object a distance d away, and returning to be detected the scattered returning light can be used in combination with the speed of light c to determine the distance d between the lidar system and the scattering site, given by:

$$d = \frac{c\, t_{2d}}{2} \quad \text{[Eqn. 1]}$$

The name "lidar," originally derived as an acronym from LIght Detection And Ranging, reflects the "ranging" aspect of the technology, as is commonly used for mapping and surveying operations. For distances of d≈10 meters, the detector must have a time resolution on the order of 10 nanosecond or less to be able to distinguish the returning light from the initial transmission.

Remote lidar detection of gases is possible using spectroscopic lidar, in which spectroscopic absorption of the transmitted and scattered returning light are measured as well. This is achieved by sending a laser beam with wavelength modulations from a lidar transceiver into an environment in which the gas of interest may be present. Photons scattered from a remote point that return along the optical path to the transceiver can be analyzed for absorption at particular laser wavelengths corresponding to known absorption features for that gas. When reduced return photon counts from the remote scattering sites are detected at those gas absorption wavelengths, the concentration of gas needed to produce that absorption along the optical path can be calculated.

A tuneable lidar system therefore produces data representing both the distance range to the scattering site, usually measured in meters, and the gas concentration times the measurement pathlength, usually represented in ppm·m (parts per meter times meters).

Such a tuneable diode lidar (TDLidar) system has been disclosed in the patent GB 2586075 B, titled "Rapidly Tuneable Diode Lidar," and filed in the U.S. as patent application Ser. No. 17/615,790, both of which are incorporated herein by reference.

Figure 1:
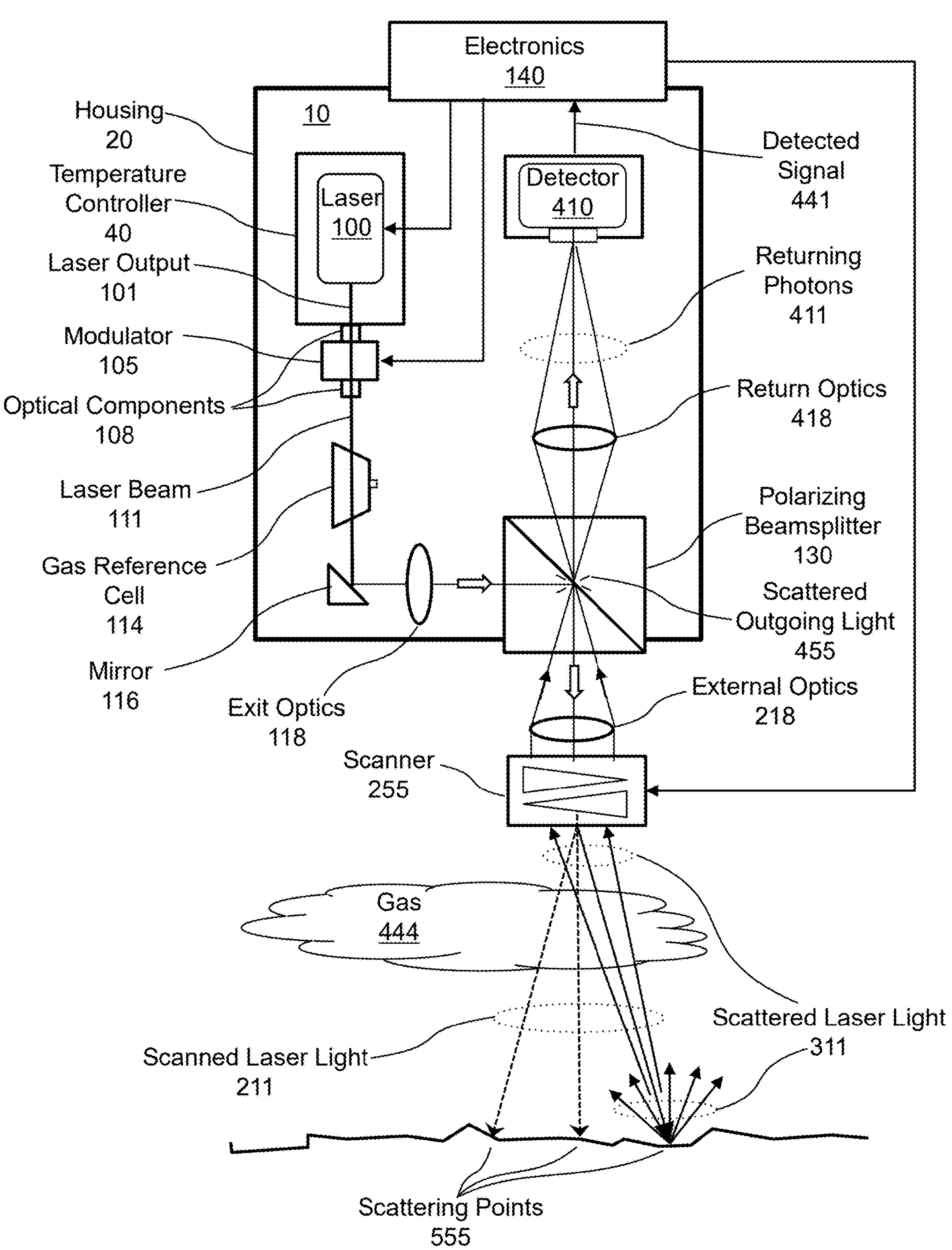
FIG. 1 shows schematic diagram of a lidar system as may be used for some embodiments.

A schematic illustration of an example of a lidar system 10 to accomplish the remote lidar detection of a gas 444 is illustrated in FIG. 1. The system illustrated comprises an enclosure 20 containing: an optics assembly 30 that includes a laser 100, transceiver unit 110 that relays the laser output beam 111 to pass out of the lidar system 10 and to also collect light returning from a scene onto a detector 410; a scanner 255 to direct the beam to various locations within the scene, and electronics 140 to provide signals to the optics assembly 30 and laser 100, and to collect signals from the detector 410 and process them.

The laser light source 100 may be any laser capable of producing a continuous wave optical output at or near wavelengths corresponding to a gas absorption line of interest. One example is a multi-quantum well distributed feedback (DFB) diode laser. Such a laser may be operated at an eye-safe of output power of approximately 10 mW at a wavelength of λ≈1651 nm (corresponding to a well-known methane absorption line).

The output 101 from the laser 100 is driven by a current provided by control electronics 140. When the current is altered, the output wavelength changes, and so a periodic current modulation has the effect of scanning the wavelength. A typical wavelength scan is achieved by adjusting the current to the diode laser at a frequency of approximately 1 MHz, or a period of 1 μsec. The current scan range needed to provide output encompassing the 1651 nm $CH_4$ absorption line (FWHM of approximately 50 pm) is approximately 60 mA.

The laser 100 may also have a temperature control device 40, typically a thermoelectric or Peltier cooler, that sets the overall temperature of the diode laser 100. For a typical system, the temperature control device 40 may be integrated into the laser device packaging, and the temperature set to be near or at ambient temperatures, but controlled to remain stable within ±0.01° C.

The optical components of the optics assembly may also include a number of fiber or fiber-coupled components, such as a polarizer, that control the properties of the laser output 101. A fiber coupled external optical modulator 105, such as a Semiconductor Optical Amplifier (SOA), which may be polarization-maintaining, will typically also be included in the optics assembly. In some configurations, this modulator 105 provides binary amplitude modulation (on/off) for the laser output 101, and this modulation may also be controlled by the control electronics 140. In some configurations, the modulator 105 may also have a temperature controller, such as a thermoelectric cooler, to maintain stability and control of the modulation characteristics.

The output of the optics assembly will typically be a fiber coupling paired with additional free-space optical components 108 to produce a freely propagating collimated output beam 111 of laser light. In some configurations, the output beam 111 is both collimated and polarized.

The output beam 111 may then pass through an optional gas reference cell 114, which can provide a guaranteed absorption for the gas of interest even if no gas is present in the external scene, and then be reflected off a mirror 116 and pass through additional optical components (shown as exit optics 118) to modify the beam properties for transmission outside the enclosure 20. In the configuration illustrated, the exit from the enclosure 20 occurs by reflection off a polarizing beam splitter 130, which also serves as a window to the outside world. In other configurations, the polarizing beam splitter may be completely contained within the enclosure 20, and an additional external window used to transmit the laser output beam 111 out of the optical transceiver assembly.

Shown at a reflecting surface of the beamsplitter are elements of scattered outgoing laser light 155, which may occur if there are minor imperfections or roughness on the beamsplitter surface. In some embodiments, detection of backscattered light 155 by the detector 410 can be used as an indicator of the time the modulated laser pulse departs the lidar system to enter the scene. When used in this manner, described in more detail below, care may be taken to provide that the detected scattered outgoing light is of a comparable intensity to the returning laser photons 411 from the scene. As an example, a scattered intensity as measured by the detector 410 to be 400,000 counts per second may correspond to an incident power of 0.69 pW for a detector with ~7% efficiency (for $\lambda$=1651 nm photons) may be adequate to be allow detection of the scattered outgoing light without causing saturation problems for the detector.

In some embodiments, the optical elements can be superpolished so that they have minimal backscattered light, as is described in more detail in U.S. patent application Ser. No. 17/663,102, which has been incorporated by reference herein in its entirety.

Once laser light as an exit beam 131 has exited the enclosure 20, it may pass through additional external optics 218 that further shape and condition it. These optics may include a lens to collimate the divergent beam, additional polarization components, such as a quarter wave plate, to produce output that is circularly polarized. The output beam may also pass through an angular deflection system, such as a scanner 255, that directs the exit beam over a range of angles in two- and/or three-dimensions in an external scene to be measured. The scanning and beam deflection control may also be controlled by the control electronics 140, and coordinated with the signals driving the laser drive current (and therefore the wavelength scan) and also the amplitude modulation.

In some embodiments, a scanner 255 may be used to direct the outgoing laser light at different angles into the scene. One example that may be used in some embodiments is a Risley prism scanner, for which the full angular range is typically up to 0.5 radians in both x and y. Angular dimensions may use any number of coordinates, including horizontal and vertical coordinates $\theta_h$, $\theta_v$ or polar coordinates $\theta$ and $\phi$. However, any system of external optics that can systematically direct the laser output into the environment over a range of angles may be utilized. Examples of optical components for the external optics and scanner are presented in more detail in U.S. patent applications listed above as incorporated by reference in this application.

The outgoing scanned laser light 251 will follow the beam path as directed by the scanner 255, and pass through the environment. In some situations, the exit beam may pass through some concentration of a gas 444 having absorption features for some of the wavelengths produced by the scanned laser. Eventually, the light may scatter off various scattering points 555 on various objects in the environment (trees, ground, rocks, buildings, fences, etc.). Some of the scattered laser light 311 will be backscattered along the same path as the outgoing scanned laser light 251, encountering the scanner 255 and being collected by the external optics 218. This returning scattered light 311 will also pass through the gas 444, which can absorb additional light.

The scattering from the scattering points 555 in the environment is typically diffusive scattering, so the returning light will be much weaker than the outgoing light. Typically, only a tiny fraction of the scattered light (~$10^{-10}$) returns to the transmitting system. The returning photons pass through the scanner 255 again, and are therefore collinear with the initial source of the photons. However, as the photons have generally been depolarized when they have been back-reflected from the distant object, or if a quarter wave plate has been used in the external optics 218 to make the output scanned laser light 251 circularly polarized, the polarization state of the reflected photons 311 now includes components with polarization the opposite from the outbound photons. Therefore, when entering the polarizing beam splitter 130, many of the returning photons 351 are not reflected, but pass through the polarizing beam splitter 130.

Internal return optics 418 then collect the returning photons 351 and direct the returning photons 411 into the detector 410. The detector 410 may be any photodetector that can detect weak amounts of light and even single photons, such as an avalanche photodiode or a single-photon avalanche diode (SPAD). The SPAD device may incorporate a passive quenching resistor as in a negative feedback avalanche diode (NFAD), or alternatively, be accompanied by active or passive avalanche quenching circuitry. In some implementations, the photodetector may take the form of an array of photodetectors, to enhance imaging capabilities or improve detection performance.

The detector 410 converts the detected photons into a detected signal 441, which may then be processed electronically. The processing may include being recorded and analyzed by the same control electronics 140 used to drive the laser 100 and modulator 105, or may be recorded and analyzed by a separate set of electronics. However, some degree of processing to analyze the detected signals 441 from the detector 410 and correlate them with the signals from the control electronics 140 used to drive the laser current and to control the modulator 105 will typically be used.

Modulation and Detection in Tuneable Diode Lidar

Figure 2:
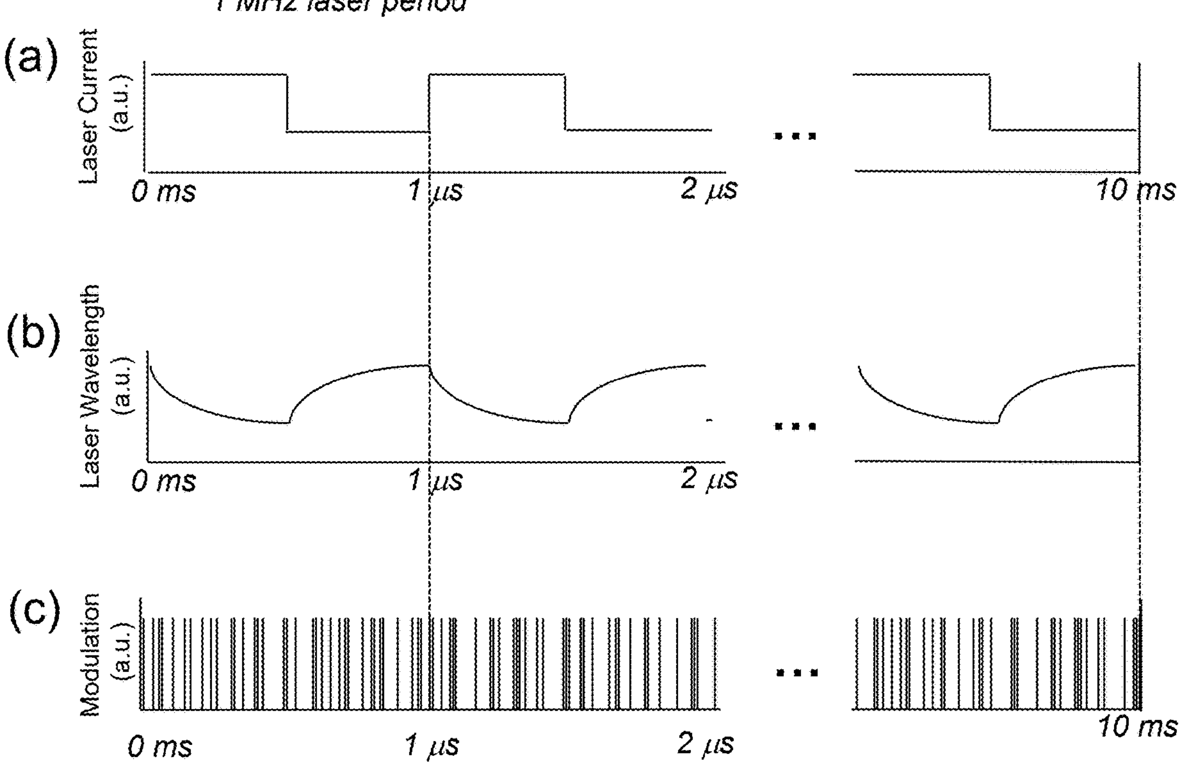
FIG. 2 shows a) variation in current driving a diode laser, b) the corresponding temperature variation, and c) modulation pulses that may be applied to the outgoing diode laser beam.

FIG. 2 shows an example of a diode laser driving and modulation approach taken in some embodiments. Although some diode spectroscopy systems may scan using variable current to cover spectroscopic wavelength ranges using waveforms such as a sawtooth wave, an alternative approach is to toggle the diode current between two well defined values, as illustrated in the plot of diode current shown in FIG. 2 in the plot marked (a). The two current values may be selected to produce, in steady state, wavelengths on each side of the spectral feature for the gas of interest.

By toggling between two fixed values of current, the system can be designed to produce these two current values precisely, with better current control and reproducibility, than is typical for a continuously variable current scan. As the current switches between the two values, the laser diode heats or cools according to thermal rise or decay, and the emission wavelength follows the diode laser temperature, as illustrated in FIG. 2 in the plot labeled (b). Therefore, even with a square wave driving the diode current, the result is a scan over the wavelength range around the absorption feature. Some approaches to relating the laser wavelength vs time within the diode laser scan have been described in additional detail in U.S. patent application Ser. No. 17/805,937, which has been incorporated herein by reference in its entirety.

The continuous wave (cw) laser output can then be modulated using an external modulator, such as a Semiconductor Optical Amplifier (SOA). Various modulation approaches have been discussed in the previously filed U.S. patent application Ser. No. 17/659,763, which has been incorporated by reference herein in its entirety. The modulation pulses may be any time duration, but typically are on the order of 5-10 nanoseconds and, in some embodiments, 7 ns. Each modulation pulse therefore corresponds to a snapshot in time when the emitted lidar light can be approximated to be a constant wavelength. An example of a set of modulation pulses is illustrated in FIG. 2 in the plot marked (c). In some embodiments, random or pseudo-random modulation sequences may be used. In some embodiments, the on/off duty cycle over time for the modulation may be approximately 25%.

The signals generated by detecting returning light from the scene can be correlated in time using the modulation pulse train and assigned to a "time bin" related to the time position during the square wave period, and hence the laser wavelength. Data corresponding to the same "time window" can be accumulated over a time interval T comprising many diode current square wave cycles. In some embodiments, the square wave diode driver is operated at 1 MHz, and data accumulated over a time interval T=10 msec, making it possible to accumulate approximately 1,000 to 10,000 samples for each time window.

Figure 3:
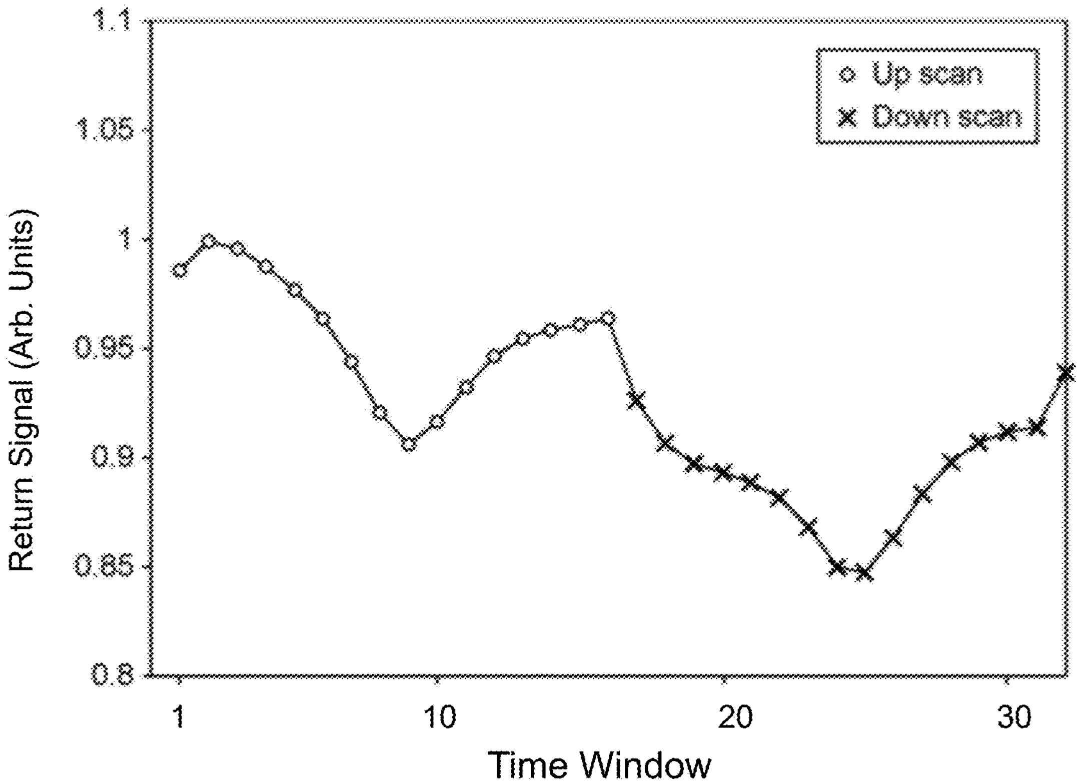
FIG. 3 shows a plot of an example of transmission over time for an absorption feature for a gas of interest using the diode laser current drive of FIG. 2.

An illustration of the detected return signal using time bins averaged over multiple cycles of current modulation is shown in FIG. 3. In the first part of the plot, the time bins for collecting data correspond to the portions of the scans when the laser current is in the high current (or "up") mode. In the second part of the plot, the time bins for collecting data correspond to the portions of the scan when the laser current is in the low current (or "down") mode. The higher current leads to higher output power, while the lower current leads to lower output power, and therefore somewhat lower return signal intensity for the "down" portion.

The plot shown in FIG. 3 has "time window" as the axis, with a point plotted for each time window. The reduction in return signal due to absorption corresponding to the gas of interest (in this case, methane absorption at approximately 1651 nm) can clearly be seen in the middle of both the "up" and "down" scan. However, this is not yet a spectrum. Instead, additional post-processing can be used to convert the time-based axis to a wavelength-based axis, as mentioned above. This can be done in part by using the predictable relationship between time and wavelength when driving the diode laser with a square wave, such as that illustrated in FIG. 2. Once converted to a wavelength-based axis, the intensity data can be further calibrated by fitting the resulting absorption spectrum to ideal spectra, such as Lorentzian function for the absorption.

Figure 4:
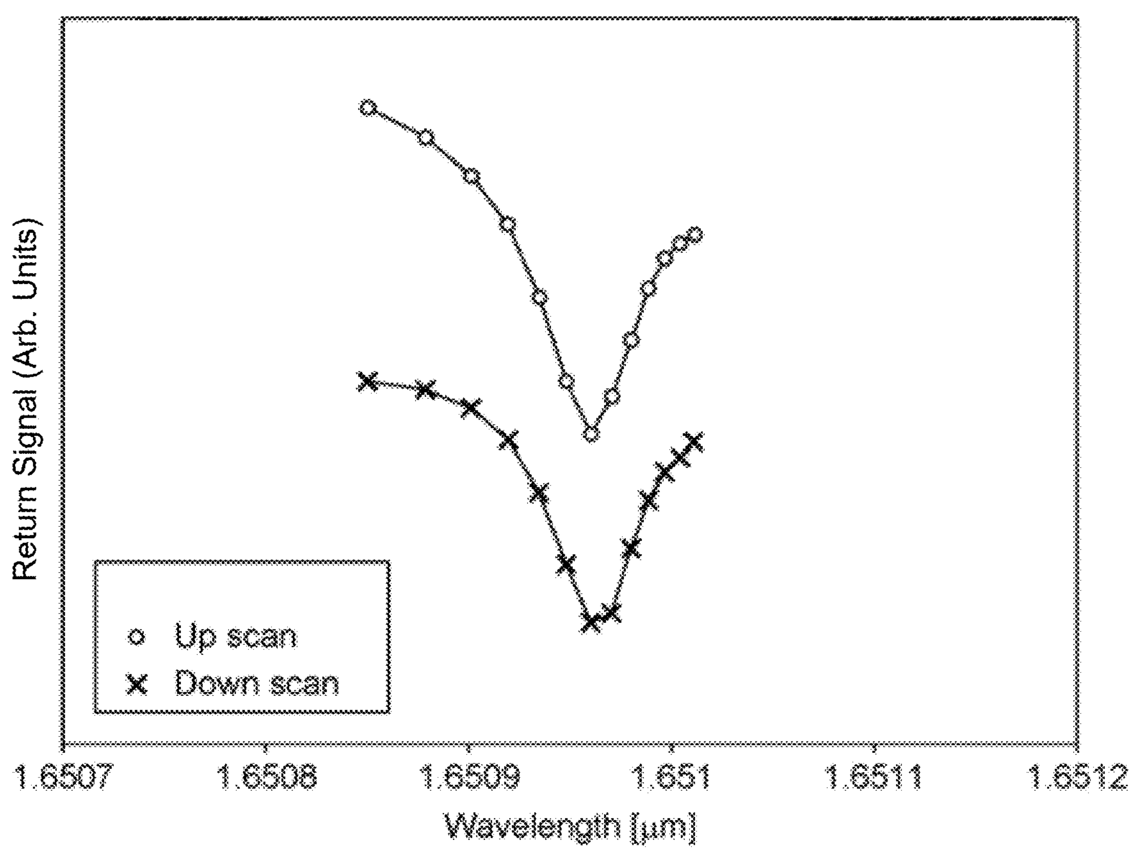
FIG. 4 shows a plot showing the conversion of a laser absorption spectrum from intensity vs. time, as shown in FIG. 3, to absorption vs. wavelength.

Data within the signal processing circuitry can assign each "time window" to a corresponding "spectral block" for further computation and analysis. The data collected over a designated time period, such as 10 ms, can be collected and averaged for each "spectral block" to produce spectra with reduced noise. The results of a conversion to wavelength are illustrated in FIG. 4. The gas absorption feature in the higher energy "up" scan and lower current "down" scan are clearly visible in this plot against wavelength.

Further details on methods for generating spectra for use with modulated diode lidar have been described in additional detail in U.S. patent application Ser. No. 17/805,937, which is incorporated herein by reference in its entirety.

Figure 5:
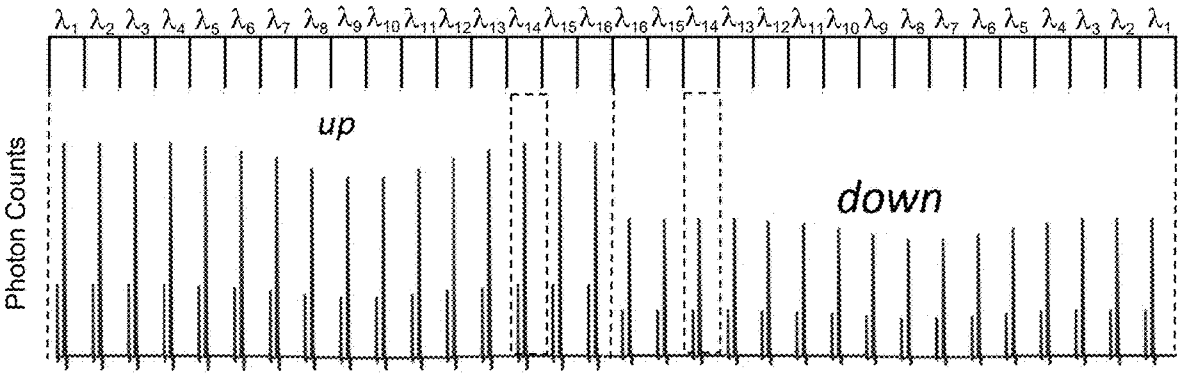
FIG. 5 shows photon count signals for multiple spectral blocks for one diode current cycle having discrete modulation pulses.

The spectra corresponding to the same wavelength may be averaged into single values for photon intensity for that wavelength. FIG. 5 illustrates a sequence of spectral blocks for which the diode laser has been driven through 1 cycle of the square wave current. The upper axis labels the discrete spectral blocks, while the intensity signals from the photodetector are plotted side by side below, arranged in order of wavelength. The intensity signals for the "up" and "down" portions are readily visible, with an absorption dip at around $\lambda_{10}$ due to gas absorption. By accumulating signals from spectral blocks corresponding the same wavelength (for example, $\lambda_{10}$ but from multiple scans), averaging of values for absorption for a particular spectral block can occur, reducing noise. From these derived spectra, values for gas absorption can then be estimated, and a CPL in ppm·m calculated.

The total counts detected within a spectral block can be integrated to give a value for intensity I ($\lambda_i$) for each spectral block, and then analyzed to determine absorption due to the gas of interest. The technique may use pre-existing knowledge of the shape of the gas absorption line to infer the exact wavelength of each discrete time bin in the spectral. The pre-existing knowledge of the shape of the gas absorption line can be acquired through measurements in the lab, for example using HiTRAN (high-resolution transmission molecular absorption) data base, or approximations for standard lineshapes such as Lorentzian or Voigt lineshapes.

The resulting spectra can then be normalized using the diode wavelength power for the two different parts of the scan, and combined to compute a single value for absorption in ppm·m. This occurs for the given measurement time interval T (typically 10 ms). During this time interval T, the lidar system may be assumed to be pointing at one position within the scene, since scanning over the scene may take a minute or more to build up a picture, using slower mechanical scanning devices such as the Risley prism scanner.

It will be appreciated that by rotating one or both of the prisms in different ways the beam may be deflected in angle in different ways to scan different fields of view, collecting an image datapoint for every time interval T (e.g. 10 ms). The field of view defined by this prism rotation and optical beam scanning is termed the system field of view ("SFOV"). The instantaneous field of view of the transceiver, represented by the area of the beam, is termed the transceiver field of view.

Figure 6:
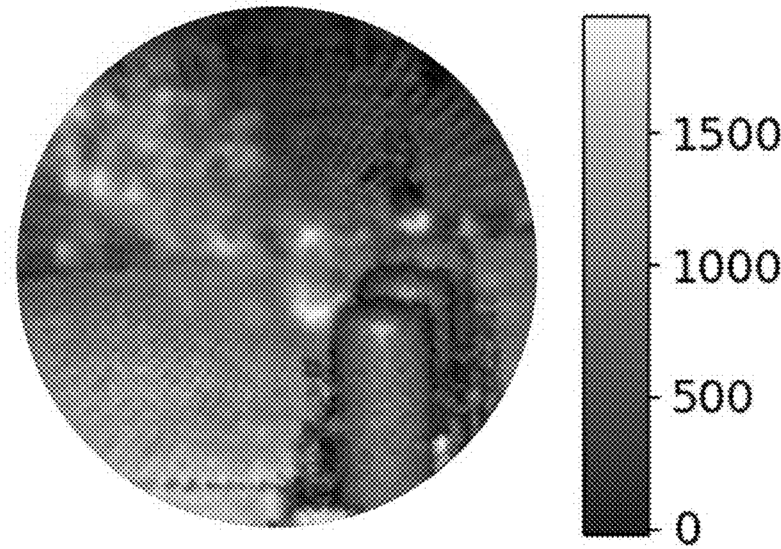
FIG. 6 shows an example of a lidar two-dimensional image comprising a gas leak.

The resulting "picture," such as that shown in FIG. 6, therefore has a value of gas absorption in ppm·m associated with each point in the system field of view for the scene, with a horizontal axis and vertical axis representing the horizontal and vertical scan deflections $\theta_h$ and $\theta_v$. Representations of angle may also use polar coordinates, with, for example, θ representing the polar angle of the output beam and ϕ representing the azimuthal angle of the output beam. The approximately constant portion of the scene illuminated during the short time interval T is sometimes called the transceiver field of view.

The detection of spectral features in the lidar data can be enhanced and calibrated by using an additional cell containing a low concentration of the gas to be detected. This cell can be positioned within the lidar system in the outgoing arm of the transmission optics, as was illustrated in FIG. 4 with the gas reference cell 114. By passing the outgoing laser light through this cell, some degree of absorption at the wavelength corresponding to the gas of interest can be guaranteed. This shows up in the final absorption spectrum, and can be subtracted as a known quantity to produce the gas concentration values of ppm·m that can be ascribed solely to the elements of the scene. Such an internal reference cell may, for example, be ~5 cm long, and have a gas concentration that provides a CPL of ~500 ppm·m at the methane absorption line at 1.651 nm, Details for systems and methods for using a gas reference cell for diode lidar have been disclosed in U.S. patent application Ser. No. 17/786,245, which has been incorporated herein in its entirety.

Distance Determination in Tuneable Diode Lidar

A measure of CPL corresponding to a given angle itself gives no information how far out along that path the detected gas is occurring. To infer how long the pathlength for the detected gas may be, distance derived from the time difference measurements in the lidar signals may be used.

In some systems, the transmitted outgoing laser light is modulated in a series of random or pseudo-random pulses, and the signals used to modulate the laser may also be sent to the detection electronics. These signals may also trigger a recording of the detector intensity over time as the returning photons arrive and are detected, and may provide the trigger for initiating data collection in an intensity histogram, described in further detail below. The trigger signal may itself provide an initial time value $t_0$ for the initiation of distance estimations, or a time value to may be calculated to be some discrete time after the trigger signal is initiated, based on calibrations from objects a known distance away from the lidar system. However, such a triggering event is electronic, and while it is synchronized with the time that a laser pulse should be transmitted, it is not a confirmation that the actual pulse was correctly sent.

Alternative approaches to triggering an event to designate $t_0$ can include deliberately splitting off a portion of the actual modulated laser light and directing it towards a second detector within the lidar transceiver. The detected initial pulses are then used to trigger the electronics to begin measuring the time to the detection of a return signal. This can have an advantage in that actual laser light being transmitted is used to trigger the time measurement, and the second detector need not be as sensitive or expensive as the single-photon detector used for the lidar signals. However, if a separate detector for the portion of the outgoing laser light is used, time synchronization with the returning signal may still be an issue.

In some systems, the same photodetector used to detect scattered returning light may also be used to detect the initial transmitted light pulses. This reduces the delay or synchronization problems that can come with using separate detectors or electronic paths for the outbound triggering pulse and the detector signal from the returning scattered light. However, the portion of the laser split from the outgoing beam should be severely attenuated, so that the power level is comparable to the returning scattered lidar light.

Any system that deliberately splits off some of the outgoing laser light is at a disadvantage, in that it has reduced the amount of light being transmitted, and therefore also reduces the amount of light that can be returned.

When using single-photon detectors, it is often the case that enough internal scattering from the various internal surfaces of the optical elements, such as the beamsplitter 130 in FIG. 1, may be bright enough to cause a detectable signal at the detector. Although these internal optical components can be specified to be well polished and have greatly reduced scatter, some photons can still be scattered by minor imperfections from a surface that is within the usual polishing tolerances. This internal scattering can be detected by the photodetector 410, and can be used as a timing marker to indicate the time the laser pulse is transmitted to the scene. Unlike the options described above, this loss will occur anyway, so there is no need to reduce the power further by deliberately separating a portion with an additional beamsplitter.

Figure 7:
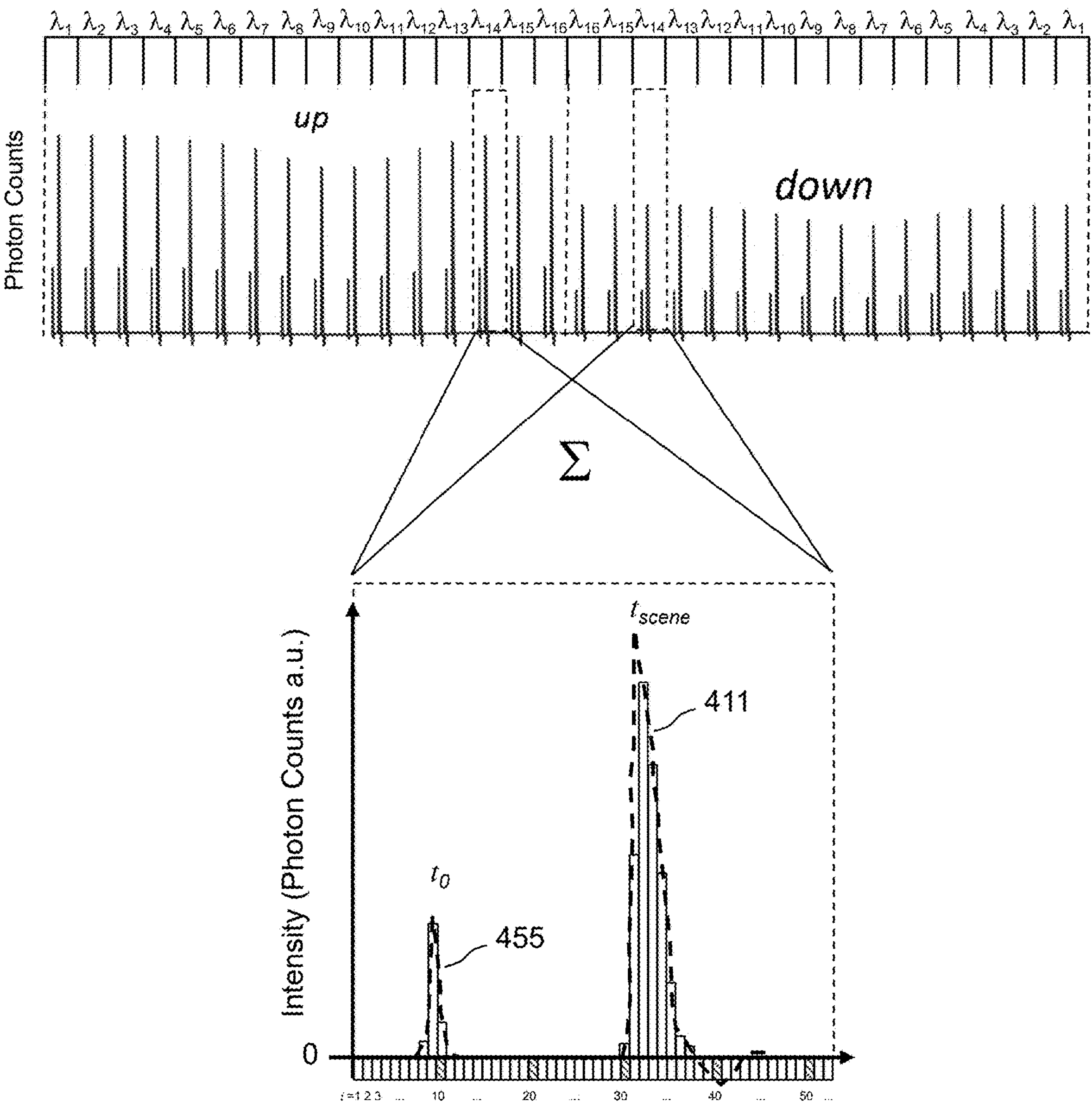
FIG. 7 shows the multiple spectral blocks of FIG. 5, and a detail of a histogram formed from the photon count signals for one particular wavelength.

The spectral blocks described above may additionally contain granular information in time, resulting from intensity photon count signals from the photodetector as they are recorded and processed. FIG. 7 illustrates a sample of this time domain signal collected for a particular set of spectral blocks. This data represents an ensemble of several scans at this particular wavelength, summed or grouped together for each corresponding time bin used for processing. The vertical axis represents summed photon counts, shown as trace of the original data (dashed line) and also histogram values for "time bins" used for plotting along the horizontal axis. In this illustration, only 52 time bins are illustrated, but any number may be used. In some embodiments, 512 time bins are used for representing a single spectral block.

In the plots shown side by side in FIG. 5 (and reproduced in the upper portion of FIG. 7), each return signal can be seen to have a small intensity spike, followed later by a larger spike. These correspond to the detection of the backscatter when the outgoing laser pulse is sent into the scene, and then later the detection of the scattered light returning from the scene. The initial pulse from the internally backscattered light is indicated by reference number 455, while the second pulse from the light scattered from the scene is indicated by reference number 511.

The difference in time between the outgoing pulse and the returning scattered light can provide an estimate of $t_{2d}$ needed for the distance computation that was shown in Eqn. 1.

Each spectral block may be divided into a number of time bins, typically 512 time bins. These time bins may be represented for the spectral block by an index value i, with an associated time $\tau_i$ representing a specific discrete time associated with index value i for the time bin within the spectral block. The respective time value associated with the spectral block may be a time at the beginning of the time bin, a time at the midpoint of the time bin, a time at the end of the time bin, or some other designated point within the time bin.

If the time bins are, for example, 8 ns long and the midpoint assignment is used, time bin 1 would have $\tau_1$=4 ns, time bin 2 would have $\tau_2$=12 ns, etc.

In some embodiments, the times associated with the time bin with the largest intensity signal may be taken as the time measurement. So, for example, in FIG. 7, the greatest intensity from backscatter from the outgoing light occurs in time bin 9, while the greatest intensity from light returning from the scene occurs in time bin 32. If time bins are 8 ns long and the midpoint of the time bin is taken as the assignment of the associated time, the time $t_0$ associated with the outgoing pulse would be $t_0$=68 ns, while the time $t_{scene}$ associated with the backscatter from the scene is 31.5×8 ns=252 ns. The time to the scattering site and back is therefore $t_{2d}$=252−68=184 ns, corresponding to a distance to the scene of 2d≈55.0 meters, or d≈27.5 meters.

However, simply using the time bin with the highest intensity may lead to some error. Two adjacent time bins may have nearly equal intensity, but picking one over the other causes grid snap that could lead to an error of nearly half a time bin (in this example, 4 ns, corresponding to about 1.2 meters).

An alternative approach to estimating the time difference involves a weighting computation that is similar to those used for center-of-mass (COM) or center-of-gravity (COG) calculations. In this case, instead of forcing a digital snap to a grid, each intensity value in the grouped intensity data is used as a weighting factor to multiply the time value for the corresponding ith time bin, normalized by the sum of all the intensities. The result, summed over the relevant time bins with non-zero intensity, is:

$$t_{scene} = \frac{\sum_{i=1}^{N} I_i(\tau_i)\tau_i}{\sum_{i=1}^{N} I(\tau_i)} \quad \text{[Eqn. 2]}$$

where $\tau_i$ is the time value for the corresponding ith time bin. This provides a finer-grained estimate of the time than a simple grid-snapping.

A similar computation can be made for the intensity for the time bins associated with the initial pulse from internal backscatter, resulting in a similarly fine-grained value for $t_0$.

The resulting time difference for the summed spectral block is $$t_{2d} = t_{scene} - t_o \quad \text{[Eqn. 3]}$$

In this manner, a value for the time $t_{2d}$ for each time interval T can be computed and stored, along with the determined CPL for the gas of interest and the lidar system angle setting during the time interval T. This first lidar dataset comprising ($\theta_h$, $\theta_v$, CPL($\theta_h$, $\theta_v$), $t_{2d}$ ($\theta_h$, $\theta_v$)) is then used for further processing and analysis.

Determination of Ambient Concentration.

Figure 8:
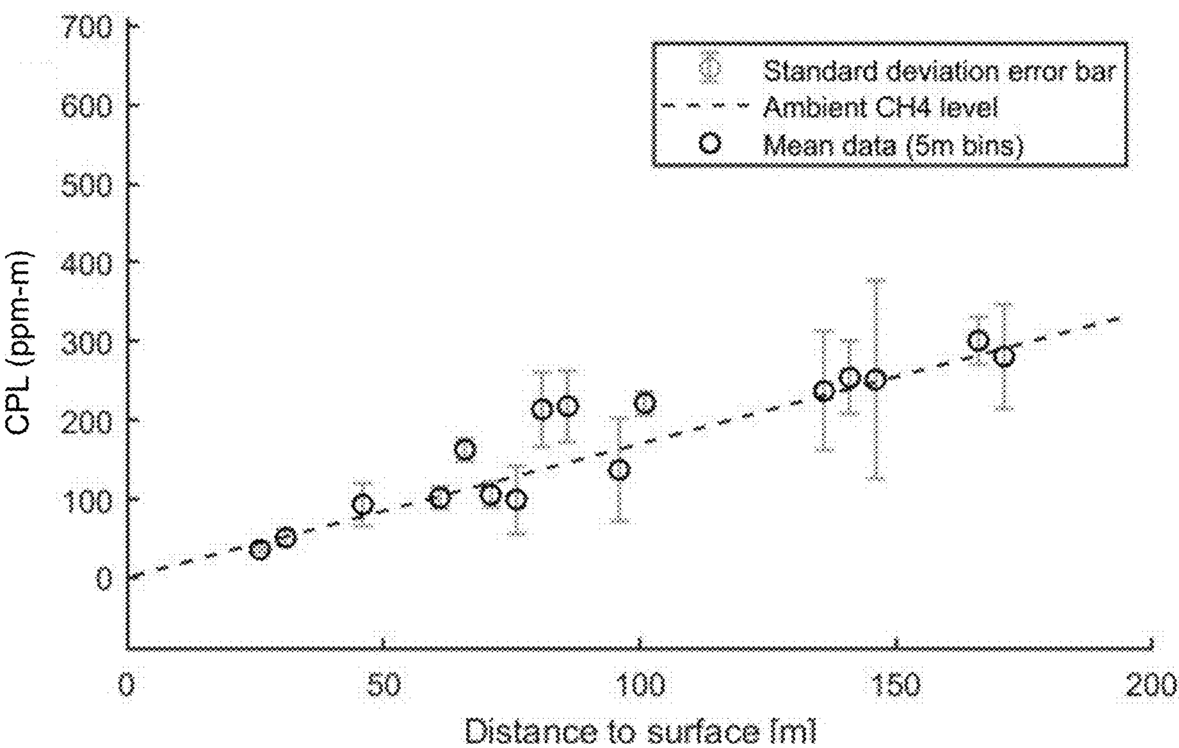
FIG. 8 shows a plot of CPL vs. distance in an environment with ambient concentration of methane.

FIG. 8 illustrates a plot of determined CPL vs distance for a representative lidar dataset. Measured CPL values are shown as open circles, with error bars indicating ±1 standard deviation. As the data are collected from further away (larger distance values), the measured CPL increases. The fit can be approximated by a linear fit, and conventional linear regression techniques can be applied to the data in the dataset to produce the dashed line. The dashed line can be interpreted as representing contributions to CPL from ambient gas.

Once this data has been analyzed as a baseline, anomalous CPL values that deviate significantly from this baseline may be more confidently identified as potential leaks.

As lidar signals are produced detecting weak scattered light from some distance away using photon counting detectors, significant noise may be present in the data. It can therefore be a challenge to determine what is baseline (normal ambient measurements) and what is anomalous, since the calculations are all inferred from data collected in the same scan.

Variations in returned scattered light may be caused by several external factors other than presence of gas, such as varying object distances and reflectivity, and varying weather conditions including fog and snow. Such variations in signal are not spectroscopically selective in the same way as gas absorption, and so are largely not manifested as variations in measured CPL. However, biases in the measured gas CPL can occur when these external signal variations are combined with non-linearities and saturation effects in the detector.

Several techniques may be applied to address these issues.

First, in monitoring an environment, baselines taken day-by-day may serve as a historical record of ambient gas concentrations. The data may be accumulated over time, and analyzed as an ensemble, or as a function of time. The larger the dataset, the better random variations and noise may be reduced. If the baseline data over time shows one steady value, and an anomalous higher gas concentration suddenly appears one day, and only for particular scanning angles, it is highly suggestive of the presence of a leak.

Second, potentially unreliable datapoints may be "filtered" out of a collected lidar dataset. Filtering can occur for at least two kinds of data—those with ambiguous distance, and those with ambiguous CPL values.

When distance measurements d are collected in two sequential time intervals (each of duration T, typically 10 ms) are significantly different from each other (for example, a difference of 10 meters or more), the scattering from the remote object in the scene is likely occurring at a boundary or edge of the object, which can be more irregular. Removal of sequential datapoints having distance values that differ by more than certain, pre-determined threshold distance can help ensure that the data being analyzed for the computation of ambient CPL contributions is from consistent data from constant are consistent.

This may be followed by an additional filtering step, to remove extremely anomalous results that may be potential outliers and therefore due to a leak or other another anomalous source of gas. Values of CPL that are greater than a pre-determined number of standard deviations away from the mean may be filtered out of the dataset entirely before analysis. In some embodiments, CPL values that deviate from the mean by more than 3 standard deviations may be removed to form the revised dataset. In some embodiments, CPL values that deviate from the mean by approximately 4.5 standard deviations may be removed to form the revised dataset.

An additional approach to filtering may involve a more detailed statistical analysis of the noise properties of the CPL vs. distance data itself. Once data with anomalous distance values and CPL values that are deemed to be outliers have been removed, the data may be stored as a revised lidar dataset. This revised dataset may also use "distance bins" to group the CPL data. In some embodiments, 30 distance bins may be used.

Each distance bin represents a range of distances, and the CPL values are averaged within each distance bin to create a compressed internal model. For each bin with n datapoints, the model uses a weighted average, with the weighting factor being the inverse of a predicted noise level for the data points collected over each time interval T. Therefore, for each distance bin, the standard error of the weighted mean CPL can be calculated.

To perform this analysis, the mean of the CPL values within each distance bin $\overline{CPL}|_{bin}$ is computed using a weight function $w_i$ incorporating the estimated standard deviation $s_i$ of the n values of CPL within the distance bin:

$$w_i = \frac{1}{s_i^2} \quad \text{[Eqn. 4]}$$

making the average CPL value within the distance bin:

$$\overline{CPL}|_{bin} = \frac{\sum_{i=1}^{n} w_i CPL_i}{\sum_{i=1}^{n} w_i} \quad \text{[Eqn. 5]}$$

Using the empirical noise model calculation of the $s_i$ standard deviation, the standard error of the weighted $\overline{CPL}|_{bin}$ for each distance bin is calculated using:

$$\text{Var}(CPL)_{wtd} = (s_{CPL}^2)_{wtd} = \frac{\sum_{i=1}^{n} w_i (CPL_i - \overline{CPL}|_{bin})^2}{\sum_{i=1}^{n} w_i} \frac{n}{n-1} = \left[\frac{\sum_{i=1}^{n} w_i (CPL_i^2)}{\sum_{i=1}^{n} w_i} - (\overline{CPL}|_{bin})^2\right] \frac{n}{n-1} \quad \text{[Eqn. 6]}$$

giving the standard error of the weighted mean to be:

$$(s_{\overline{CPL}}^2)_{wtd} = = \frac{(s_{CPL}^2)_{wtd}}{\sqrt{n}} = \sqrt{\frac{\text{Var}(CPL)_{wtd}}{n}} \quad \text{[Eqn. 7]}$$

The least squares weight is the inverse of the standard error, ensuring that data points with lower uncertainty are given higher weight during the weighted least-squares fitting process.

Therefore, the value of CPL may be determined to be statistically significant

This can be followed by a linear regression computation using standard mathematical forms for linear regression, as was illustrated in FIG. 8, to estimate the contribution from ambient gas absorption. However, the computation may now use the inverse of the estimated standard error instead:

$$1 / (s_{\overline{CPL}}^2)_{wtd} \quad \text{[Eqn. 8]}$$

to produce a liner fit with distance d:

$$CPL = m\,d + CPL|_{cell} \quad \text{[Eqn. 9]}$$

The slope m of the regression represents the contribution of the ambient methane concentration, and the weight of each data point is determined by the least squares weight (the inverse of the standard error). This weighting ensures that bins with lower variability (higher confidence) have a stronger influence on the final fit. Given the distribution of distances can be very sparse, this helps improve the robustness of the results The constant zero-intercept will be a CPL value that includes (and, in the typical case, is solely due to) the absorption from an internal gas reference cell used for calibration, as was illustrated in FIG. 1. For a typical lidar unit, this value may be is $CPL|_{cell}$=500 ppm·m, although other cells with other values may be used.

Figure 9:
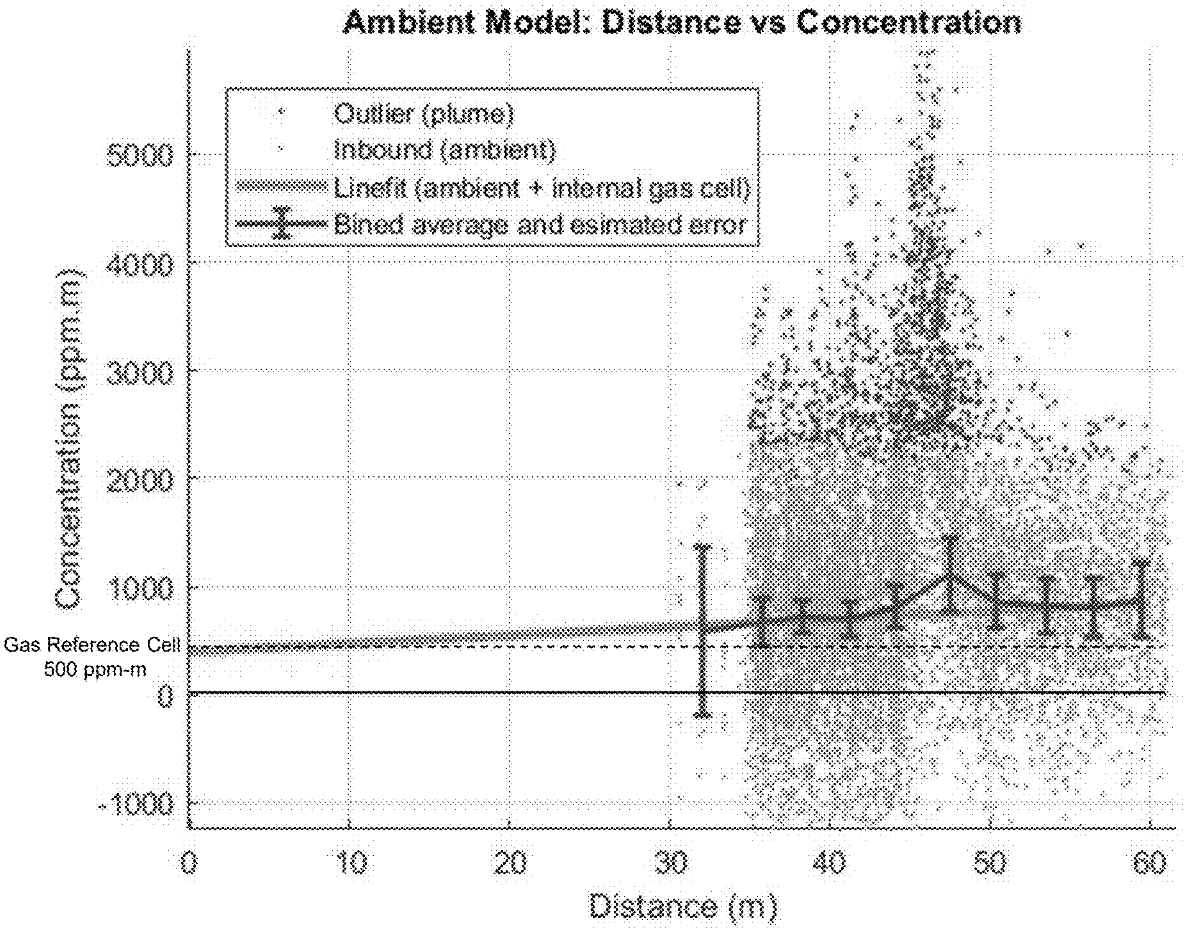
FIG. 9 shows an exemplary plot of lidar data with outlier CPL values in excess of a predetermined threshold identified

An example of results from such a computation are shown in FIG. 9. The plot of FIG. 9 shows a lidar dataset plotted as determined values of CPL in ppm·m vs. distance d. When d=0, the CPL is the intercept value due to the gas reference cell. The grey dots represent all the lidar datapoints within the dataset, with outliers above a certain number of standard deviations from the mean (in this illustration, above 4.5 standard deviations) are shown in red. The purple line represents averages computed after the filtration steps removing the outliers and distance anomalies have been removed, and the green line shows the linear ambient contribution to the CPL.

As can be seen in the data, a large anomaly at approximately 48 meters with significantly higher values of CPL is observed.

The goal of the present disclosure is to form a revised lidar dataset with a correct estimation of the ambient gas concentration taken into account. Further processing of the datasets for evaluation of the CPL data, leading to actions such as plume detection, computation of flow rates for a gas leak, or transmitting an alarm when gas concentrations are above certain predetermined values, may follow the creation of the revised lidar dataset.

Process Operations for Distance Correction in Tuneable Diode Lidar

Figure 10:
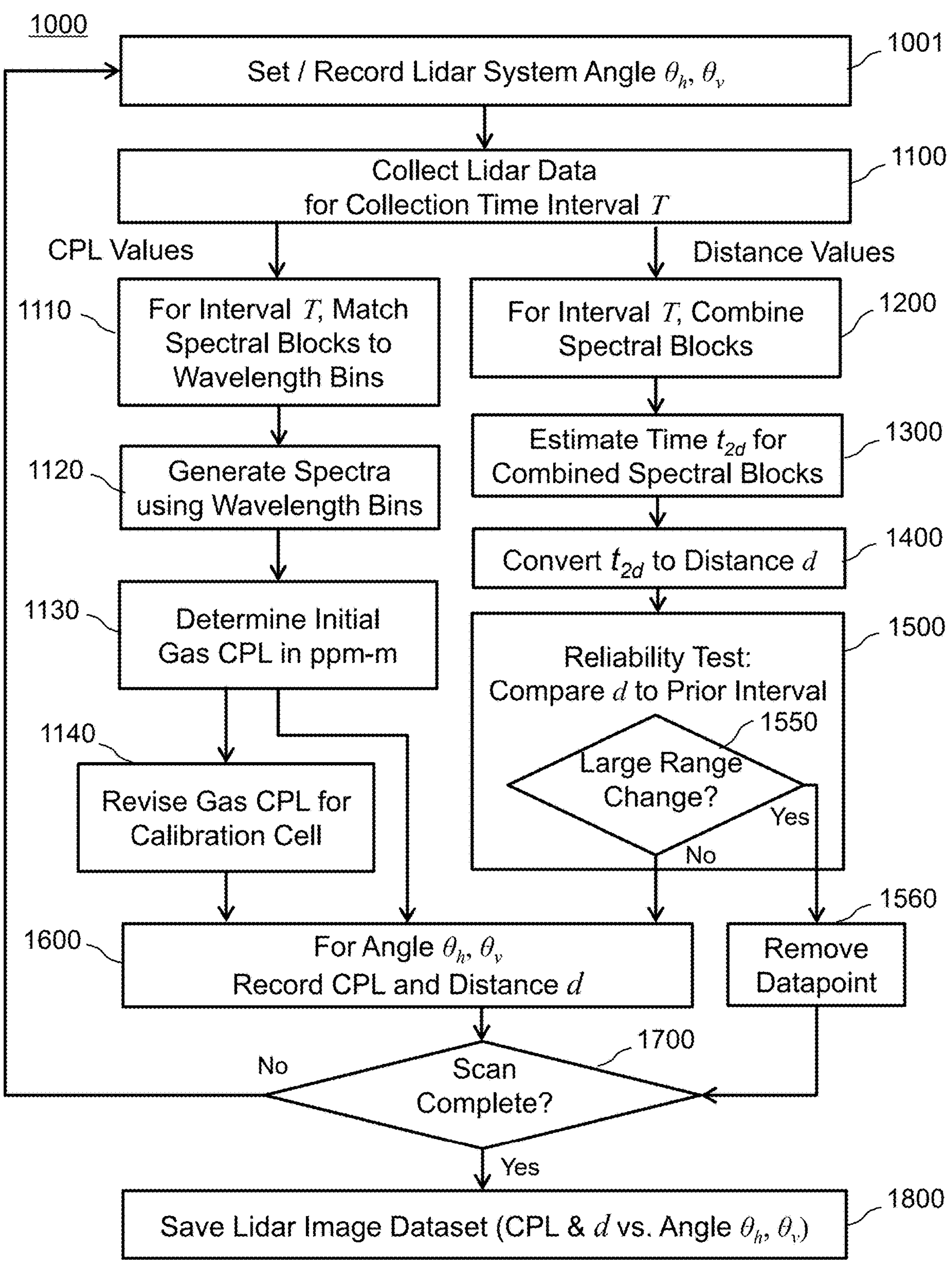
FIG. 10 shows a flow chart for a method of generating a revised dataset that may be used to compensate for ambient CPL for a diode lidar image.
Figure 11:
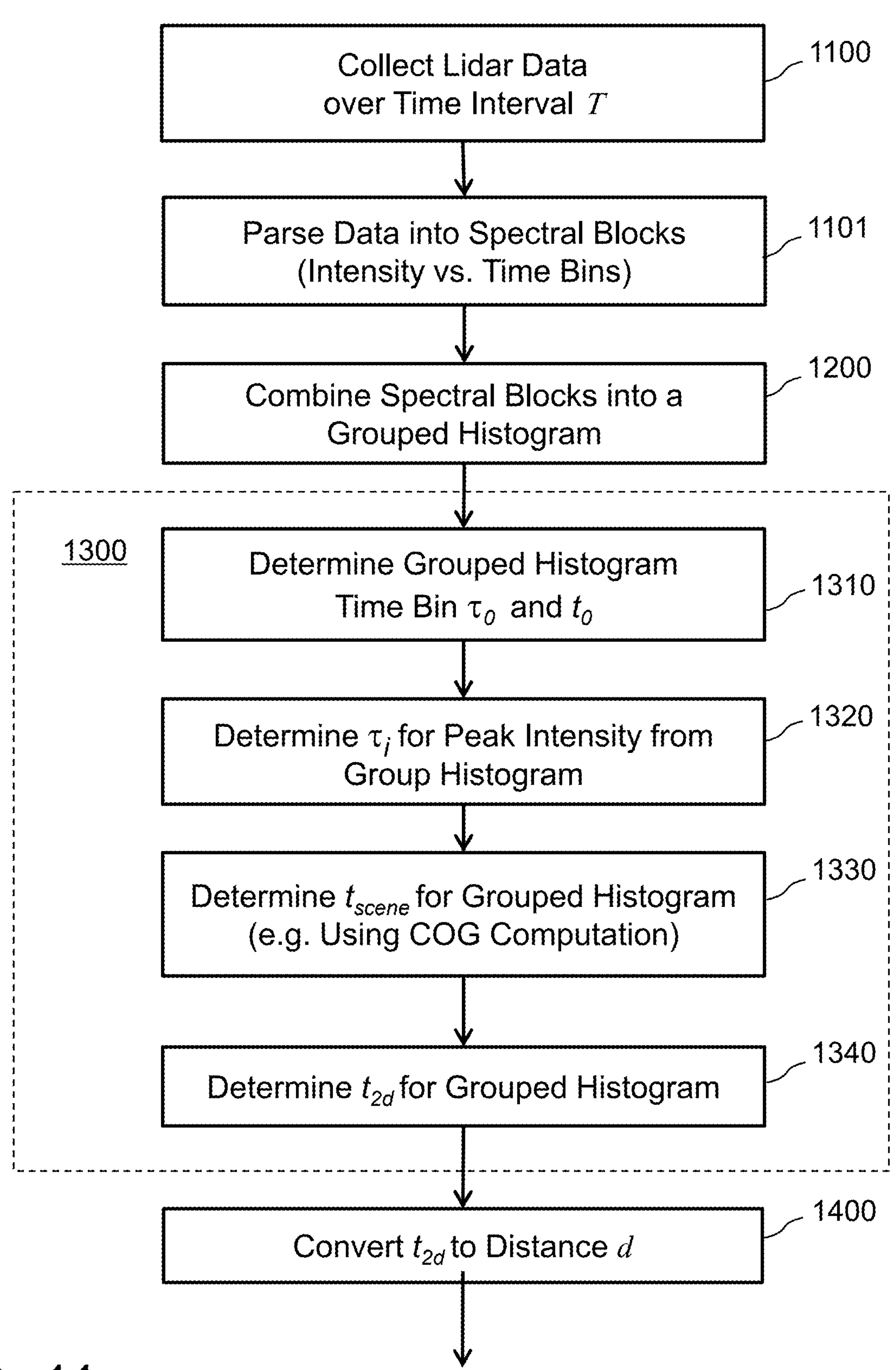
FIG. 11 shows a more detailed flow chart for a portion of the method of generating a revised dataset of FIG. 8.
Figure 12:
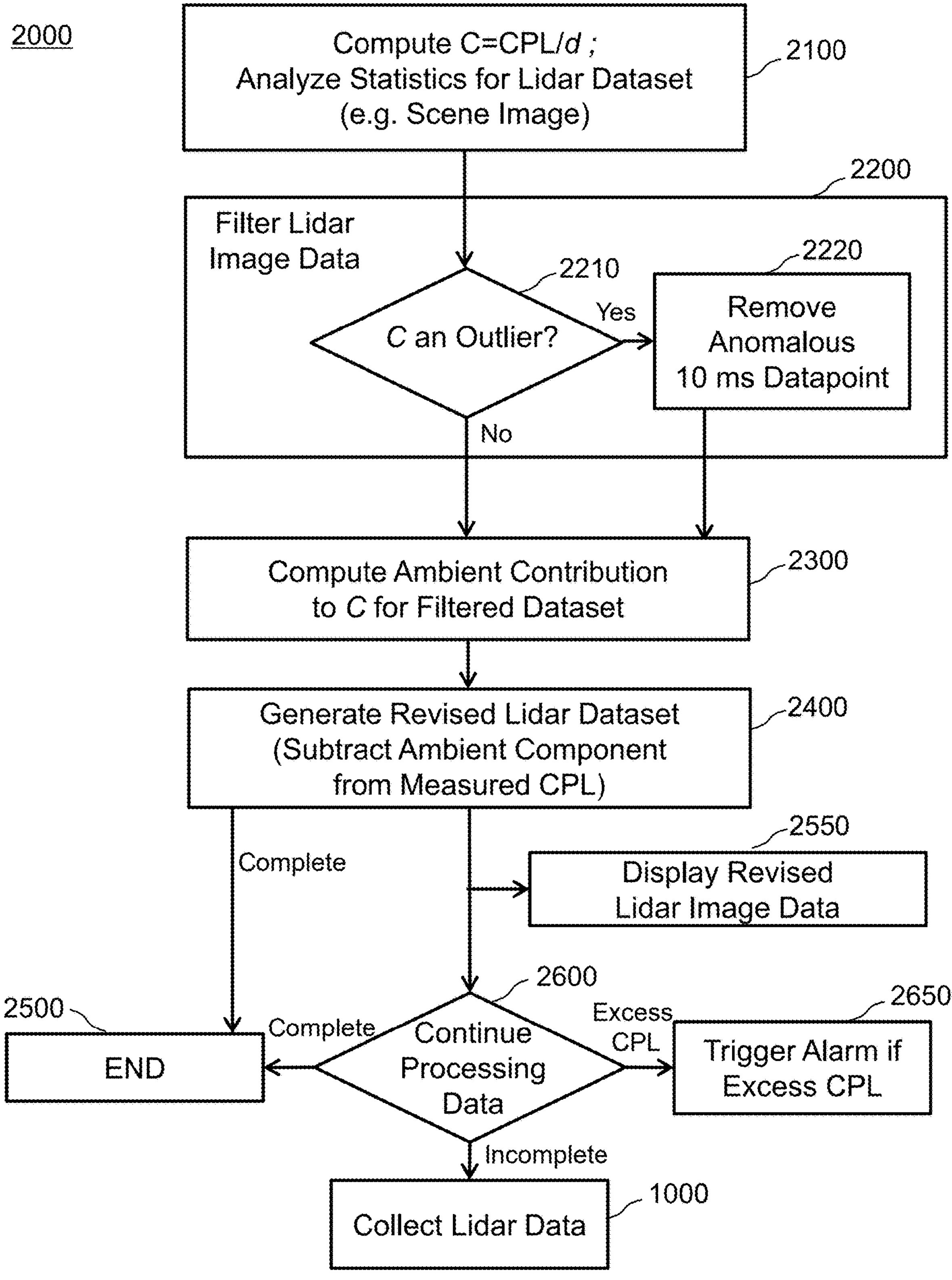
FIG. 12 shows a flow chart for a method of determining a value for ambient gas concentration $C_{ambient}$ from the revised dataset, and generating an alarm if an anomalous value for CPL is detected after accounting for $C_{ambient}$.

An exemplary process for using distance to better evaluate lidar image data for detecting abnormal levels of a gas of interest (present, for example, when there is a leak for a gas such as methane) is illustrated in FIGS. 10 through 12. The data collection can be carried out using the operation sequence 1000, illustrated respectively in FIG. 10 and FIG. 11, and the post-processing to determine ambient contribution to the CPL measurements is illustrated in FIG. 12. In some embodiments, these operations may be executed entirely within the lidar system using processors and memory and/or data storage devices incorporated in, or connected to, the internal control electronics. In some embodiments, these operations may be executed in whole or in part using processors and memory/storage systems external to the lidar system.

Data Collection

FIG. 10 represents the first portion of an embodiment for a process to use distance information to the evaluation of lidar data. For the initial sequence 1000 of the process, involving data collection and analysis, in the first operation 1001, the 2-dimensional angle of the laser from the lidar system into the scene is set to values $\theta_h$ and $\theta_v$ or, in the case of a continuously changing scanning system, recorded as values $\theta_h$ and $\theta_v$ at a designated point in time. For the time interval T for data collection, typically on the order of 10 ms, a slowly scanning system for the angle using, for example, Risley prisms (as disclosed above) has a scan angle that is essentially constant for the time interval T. Although horizontal x and vertical y angular coordinates $\theta_h$ and $\theta_v$ are used as examples in the flowchart and this description, other kinds of coordinate systems for the angle(s), such as polar coordinates, may also be used.

In the next operation 1100, lidar data is collected from the scene, with the lidar output scanning in wavelength, as discussed above, and also modulated in discrete, short (e.g. 7 ns) laser pulses, for which the wavelength is essentially constant during the duration of the pulse. Lidar data is collected for a predetermined time interval T, typically on the order of milliseconds. For a lidar system being scanned at 1 MHz, a 10 ms interval, representing 10,000 "up" scans and 10,000 "down" scans, may be used as the time interval T.

During lidar data collection 1100, photons from the outgoing pulse as well as the backscatter from the scene are detected. The photon counts from the detector associated with each outgoing pulse can be collected and stored into discrete blocks of detector data, with each representing a small slice of time during and after the transmission of a laser pulse. Since the wavelength will be essentially constant during this time, each chunk of detector data associated a pulse can be classified as a particular "spectral block" that is associated with a particular value for the wavelength.

Two parallel sets of operations follow: Operations 1110-1140, for deriving CPL values, and Operations 1200-1560, for deriving distance values.

CPL Calculation

In the next operation 1110, the timing information and the wavelength properties of the laser scan can be used to assign a wavelength to these individual "spectral blocks" of photodetector data. The data from multiple "spectral blocks" having the same wavelength associated with them can then be pooled into "wavelength bins" so that the returning backscatter for multiple scans that correspond to the same laser wavelength are summed together. In some embodiments, different "wavelength bins" with different pools of data for the different "up" and "down" scans may be created since the intensity difference between the two scans may affect averaging statistics. In some embodiments, data from the "up" and "down" scans may be pooled together using a normalization calculation to adjust for the difference in laser intensity.

In the next operation 1120, once the data for the time window has been collected and pooled into "wavelength bins," a spectrum for the absorption can be calculated from the wavelength bins. The process for converting lidar data to spectra may involve comparing the computed spectrum to a standard Lorentzian spectrum for the absorption, or may use other computation techniques as described in more detail elsewhere, such as the U.S. patent applications incorporated herein by reference.

Once an absorption spectrum has been computed, in the next operation 1130, an estimate for the absorption of the gas of interest along the laser path can be calculated from the absorption information. The result is generally called the concentration path-length (CPL), since it measures the total absorption along the laser path to and from the scattering point, and can be expressed in units of ppm·m (parts-per-meter times meters)

If an internal gas reference cell for the gas of interest is being used for calibration, as has been discussed in U.S. patent application Ser. No. 18/786,245, then an optional operation 1140 may be used to subtract the known contribution to CPL due to absorption from that calibration cell. This produces a revised value for CPL.

In the next operation 1600 a value for CPL (which may be either the initial CPL or, if a calibration cell is used, the revised CPL) is recorded in tandem with the corresponding values for the angle setting of the scanner.

Distance Calculation

As the CPL values corresponding to the scan angle is computed, additional computations may be carried out in parallel to evaluate the corresponding distance to the scattering site. These are illustrated in FIGS. 10 and 11.

This sequence of operations also operates on the data collected over time interval T recorded during operation 1100. As mentioned above, and illustrated in Operation 1101, the collected data is grouped into "spectral blocks" that represent photon counts from a modulated pulse corresponding with wavelengths for the diode laser scan. The data for photon counts I ($\tau_i$) in each spectral block may be assigned into histogram of i "time bins," grouping counts for pre-defined sub-intervals of time in a sequence with associated time values $\tau_i$, as was discussed above.

However, for the distance computation, in the initial operation 1200 some or all of the spectral blocks may be collected into a single pooled dataset, regardless of wavelength.

In the next operation 1300, comprising operations 1310-1340, a computation of the return time $t_{2d}$ is carried out using the pooled dataset.

In some embodiments, as shown in more detail in FIG. 11, in operation 1310 the computation of return time $t_{2d}$ involves identifying an initial time $t_0$. In some embodiments, this may involve identifying a signal from the control electronics correlated with a pulse from the pattern of pulses used to modulate the laser light, and determining a time bin $\tau_0$ and corresponding value for $t_0$ that corresponds to the signal from the control electronics, in some cases using a prior calibration operation. In some embodiments, determining a time bin $\tau_0$ and corresponding value for $t_0$ may involve detecting laser light scattered internally within the lidar system, and estimating which time bin should be considered $\tau_0$ from the intensity values of the intensity histogram, corresponding to the internal backscatter, and deriving $t_0$ from the time bin with the maximum counts for the internally backscattered photons.

After that, in operation 1320, the time bins and corresponding $\tau_i$ values associated with the largest values of intensity I ($\tau_i$) are determined.

After that, in operation 1330, a value for $t_{scene}$ from the identified time bins $\tau_i$ may be calculated. In some embodiments, a time associated with the time bin having the maximum photon count I ($\tau_i$) may be used. In some embodiments, a computation of $t_{scene}$ with a computation or algorithm using weighting factors, such as those described above that are similar to center-of-mass (COM) or center-of-gravity (COG) calculations, may be used.

In the next operation 1340, a time difference $t_{2d}=t_{scene}-t_o$ may be calculated by from the computed values of $t_{scene}$ and $t_o$.

Other alternative methods for estimating $t_{2d}$ may also be executed at this point. Methods that also evaluate statistics, such as standard deviation on the data in the pooled spectral blocks, may also be carried out. In some embodiments, computing a value for $t_{2d}$ for each spectral block or for grouped subsets of spectral blocks may be an alternative, with the individual calculated estimates for $t_{2d}$ then being averaged.

In the next operation 1400, this estimated time $t_{2d}$ is converted to a distance d using known information about the speed of light. The variance, standard deviation, and other statistical metrics for these values of $t_{2d}$ may also be estimated, in operation 1400.

It may be desirable to identify and remove unreliable distance values. If the transmitted light scatters from a solid target that is a fixed distance away, such as, for example, a solid wall, the variation over sequential time windows should be low, and the data considered reliable. However, if the scanner happens to be pointing at objects of ambiguous distance, such as the edge of a wall dropping further away or a tree with different distances for the various branches and trunk, or have other variations, the variance in the distance may be high, and the data considered unreliable.

In the next operation 1500, a reliability test, such as comparing the distance measured in the present time interval of duration T with the distance measured for the immediately previous time interval of duration T.

In operation 1550, the results of this reliability test are evaluated.

If the difference in distance between to sequential time intervals is found to be less than a pre-determined threshold value, meaning there is no or only a small range change, such as 10 meters, between time intervals, then the process proceeds to operation 1600 and the distance value d is recorded, along with the CPL value and the corresponding angle. The process then proceeds to operation 1700, a determination if all scans for this lidar dataset have been collected But if the variance compared to the reference value is greater than a pre-determined threshold value, resulting in a large range change, then the process instead proceeds to operation 1560, where the datapoint is identified as removed for use in subsequent computations. After the removal of the datapoint, since there is no distance to associate with the angle recorded for this particular time interval, the process moves on to operation 1700, a determination if all scans for this lidar dataset have been collected.

If all datapoints have been collected, in the next operation 1800, the lidar dataset, comprising at least angle coordinates $\theta_h$, $\theta_v$, and corresponding estimated values for $CPL(\theta_h, \theta_v)$ and $d(\theta_h, \theta_v)$, for each of angle settings used in data collection, is stored.

Ambient Concentration Calculation

FIG. 12 illustrates an operation sequence 2000 involving further revisions to this stored dataset, and flagging anomalous results when detected.

In operation 2100, the lidar CPL data for each angle in the image which has a corresponding reliable distance value is normalized by dividing the CPL value in ppm·m by the corresponding distance d in meters to produce a concentration C in ppm for each of the datapoints in the dataset:

$$C = \frac{CPL\ (ppm \cdot m)}{d} \quad \text{[Eqn. 10]}$$

In operation 2100, if not already computed in the previous operation sequence 1000, the entire dataset of concentration values is analyzed statistically to produce an "average" concentration value $\overline{C}$ throughout the image, with the deviation of individual concentration values from the mean for each angular value in the image also computed.

Overall ambient concentration is expected to be relatively constant for over a scene, so in the next operation 2200, the dataset is pruned to create a filtered dataset. This operation 2200 may comprise a comparison operation 2210 that compares each datapoint to the calculated mean, and, when a deviation value for a particular datapoint for C is from the mean $\overline{C}$ is above a predetermined threshold value, the datapoint may be flagged as anomalous. Following this, in operation 2220, the anomalous datapoint is removed from the filtered dataset. The anomalous datapoint will generally not be deleted entirely, just removed for consideration in the subsequent computations, while being available for other statistical computations should the need arise.

In operation 2300, once the datapoints have been examined and filtered, a new average $\overline{C}|_{ambient}$ can be calculated without the anomalous values, to produce a final estimate of the ambient concentration in the scene for the gas of interest.

In operation 2400, once the average ambient concentration has been calculated, the CPL values in the lidar dataset may be revised to remove the ambient contribution at a particular angle setting $\theta_h$, $\theta_v$:

$$CPL|_{revised} = CPL|_{measured} - \left(d \times \overline{C}|_{ambient}\right) \quad \text{[Eqn. 11]}$$

In some embodiments, a revised lidar dataset having CPL values that compensate for ambient gas concentrations may be the end goal, and no further actions are needed. The process then proceeds to directly to end in operation 2500.

In some embodiments, in operation 2550, values from the revised lidar dataset may optionally be displayed in formats that represent the data from the dataset as an image of the scene. A color-coded image with $CPL|_{revised}$ values identified using various color assignments, as was illustrated in FIG. 6, may be a common way to represent the data for rapid visual interpretation.

In a subsequent operation 2600, continued processing of the revised CPL values in the revised lidar dataset may be further analyzed. Computations concerning quantification of the gas of interest, such as gas flow volumes for a detected plume, changes in concentration over time, tracking "foreground emissions" from individual plumes and leaks within a facility, and in some cases summing the individual contributions to "foreground emissions" to determine gas flow properties for an entire site. Multiple lidar datasets representing different points of views may be combined to generate a 3-D view of a facility, which can be used for a more accurate assessment of gas flow volumes. And the statistics on the changes in the ambient levels, or "background emissions," over time can aid in forming a better understanding of the gas flow environment in and around the site.

Such analyses may include determining if there are any angle coordinates within the dataset that have corresponding CPL values that exceed a predetermined threshold. If there are CPL values in excess of the predetermined threshold, the process can proceed to operation 2650, triggering an alarm that there is an anomalous result. As an example, this may correspond to the detection of a leak for a methane processing facility when the methane value within a scan may be above a certain threshold. Additional algorithms may be applied so that multiple detections of a high methane CPL value must be observed over time before an alarm is triggered.

In the meantime, once the additional computation and analyses are completes, the system proceeds to either end the process at operation 2500 if data collection and analysis is deemed complete, or to continue to collect lidar data, returning to the operation sequence 1000 as was illustrated in FIG. 10. This entails again scanning the scene for the gas of interest, making real-time computations over each time interval T, and again creating lidar datasets and then evaluating them using the sequence of operations 2000 to create another revised lidar dataset to adjust for ambient concentrations.

With the above described operations, contributions to CPL that arise from measurement of a gas with high ambient levels over long pathlengths can be adjusted for distance, so that only high concentrations due to leaks or other dangers may be better identified, and false positive results avoided.

Other Implementations

The descriptions above have disclosed embodiments in which methane ($CH_4$) is the gas of interest, and calibrating the ambient concentrations of a gas in the field of view of a lidar system to more accurately detect and quantify leaks at a facility processing methane may be one possible application of the disclosed technology. However, as discussed above, other gasses of interest may be detected using the technology described in this disclosure, including carbon dioxide ($CO_2$), ammonia ($NH_3$), ethylene ($C_2H_4$), hydrogen sulfide ($H_2S$), or any number of other volatile organic compounds or hydrocarbons that have absorption features coincident with diode wavelengths that are tuneable and compatible with a lidar system.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations. Other implementations may include systems that may incorporate a non-transitory computer readable storage medium storing instructions executable by a processor to perform functions described above. Yet another implementation may include a method performing the functions described above in a system.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

A number of flowcharts are described herein. The logic within these flowcharts can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, a re-arrangement of steps will achieve the same results only if certain other changes are made as well. In other cases, a re-arrangement of steps will achieve the same results only if certain conditions are satisfied. Furthermore, it will be appreciated that the flowcharts herein show only steps that are pertinent to an understanding of the disclosed technology, and it will be understood that numerous additional steps for accomplishing other functions can be performed before, after and between those shown.

One or more implementations of the technology disclosed or elements thereof can be implemented in the form of a computer product, including a non-transitory computer readable storage medium with computer usable program code for performing the method steps and operations indicated. Furthermore, one or more implementations of the technology disclosed or elements thereof can be implemented in the form of an apparatus including a memory and at least one processor that is coupled to the memory and operative to perform exemplary method steps. Yet further, in another aspect, one or more implementations of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

While the technology disclosed is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method of creating a lidar image for detecting a gas, the method comprising:

in a lidar system comprising a diode laser driven by a drive current and a detector, changing the drive current of the diode laser to produce laser light over a spectrum of wavelengths, wherein points in time have a relationship to the drive current and the spectrum of wavelengths;

modulating the laser light with a pattern of pulses;

transmitting the modulated laser light at a plurality of angles into a scene;

for each of the plurality of angles, (i) detecting returning laser light scattered from scattering points in the scene over a time interval T, (ii) estimating a corresponding distance d to the scattering points in the scene, and (iii) estimating a corresponding concentration path length (CPL) value for a gas of interest;

storing data corresponding to each angle, of the plurality of angles, along with the corresponding estimated distance and the corresponding estimated CPL value in a first lidar dataset;

calculating, based on the stored data in the first lidar dataset, an ambient gas concentration ($C_{ambient}$); and generating a revised lidar dataset, comprising revised CPL values based on the calculated ambient gas concentration ($C_{ambient}$);

wherein the estimating of the corresponding distance d to the scattering points in the scene additionally comprises:

for each modulation pulse during the time interval T, generating an intensity histogram based on signals from the detector that correspond to portions of the time interval T, with each intensity histogram having a number of time bins, each time bin (i) representing a distinct time within the histogram, (ii) having an index i, and (iii) having intensity values $I_i$ associated with the index i;

combining data for intensity histograms collected during the time interval T into a grouped histogram with a grouped intensity signal $I_i(\tau_i)$ for each ith time bin;

computing a time $t_{scene}$ for the grouped histogram from time bins corresponding to the detected returning laser light scattered from scattering points in the scene; and computing the distance d corresponding to the time $t_{scene}$.

2. The method of claim 1, wherein the spectrum of wavelengths corresponds to an absorption feature for the gas of interest.

3. The method of claim 1, wherein the gas of interest is methane ($CH_4$).

4. The method of claim 1, additionally comprising:

providing the pattern of pulses using control electronics;

initiating data collection in an intensity histogram with a signal from the control electronics correlated with a pulse from the pattern of pulses used to modulate the laser light; and determining a time value to for the intensity histogram that corresponds to the signal from the control electronics; and wherein the computing of the distance d comprises using $$d = \frac{c(t_{scene} = t_o)}{2},$$

where c is the speed of light.

5. The method of claim 1, additionally comprising:

detecting laser light scattered internally within the lidar system;

determining a time value $t_0$ for a time bin corresponding to the detected laser light scattered internally within the lidar system; and determining a time value $t_{scene}$ for N time bins corresponding to detecting laser light scattered from the scene, wherein the computing of the time $t_{scene}$ comprises using a computation using weighting factors given by:

$$t_{scene} = \frac{\sum_{i=1}^{N} I_i(\tau_i)\tau_i}{\sum_{i=1}^{N} I(\tau_i)}$$

where $I_i(\tau_i)$ is the grouped intensity signal corresponding the ith time bin; and computing the distance d comprises using $$d = \frac{c(t_{scene} = t_o)}{2},$$

where c is the speed of light.

6. The method of claim 5, wherein the detector detects both:

the laser light scattered internally within the lidar system, and returning laser light scattered from scattering points in the scene.

7. The method of claim 1, additionally comprising displaying the revised CPL values in the revised lidar dataset in a two-dimensional (x,y) image format, wherein each (x,y) point corresponds to a revised CPL value for a corresponding angle coordinate, and wherein the display uses color coding to represent different magnitudes of revised CPL.

8. The method of claim 1, additionally comprising when one or more revised CPL values in the revised lidar dataset exceeds a predetermined threshold CPL value, generating a gas leak alarm signal.

9. A method of creating a lidar image for detecting a gas, the method comprising:

in a lidar system comprising a diode laser driven by a drive current and a detector, changing the drive current of the diode laser to produce laser light over a spectrum of wavelengths, wherein points in time have a relationship to the drive current and the spectrum of wavelengths;

modulating the laser light with a pattern of pulses;

transmitting the modulated laser light at a plurality of angles into a scene;

for each of the plurality of angles, (i) detecting returning laser light scattered from scattering points in the scene over a time interval T, (ii) estimating a corresponding distance d to the scattering points in the scene, and (iii) estimating a corresponding concentration path length (CPL) value for a gas of interest;

storing data corresponding to each angle, of the plurality of angles, along with the corresponding estimated distance and the corresponding estimated CPL value in a first lidar dataset;

calculating, based on the stored data in the first lidar dataset, an ambient gas concentration ($C_{ambient}$); and generating a revised lidar dataset, comprising revised CPL values based on the calculated ambient gas concentration ($C_{ambient}$);

wherein the calculating of the ambient gas concentration ($C_{ambient}$) comprises:

for the estimated CPL values stored in the first lidar dataset, determining a standard deviation for the estimated CPL values using a noise model;

generating a filtered lidar dataset from the first lidar dataset by removing one or more estimated CPL values, of the estimated CPL values, that exceed a predetermined threshold CPL deviation value;

calculating a functional relationship for CPL and distance d using the estimated distances and estimated CPL values remaining in the filtered lidar dataset; and determining a value for the ambient concentration ($C_{ambient}$) of the gas of interest using the calculated functional relationship.

10. The method of claim 9, wherein the calculating the functional relationship comprises linear regression.

11. The method of claim 9, wherein the predetermined threshold CPL deviation value is at least 3 times the standard deviation for the estimated CPL values for the first lidar dataset.

12. The method of claim 9, wherein the revised CPL values in the revised lidar dataset are calculated from the estimated CPL values in the first lidar dataset by subtracting an amount based on distance d and the determined $C_{ambient}$ from each of the estimated CPL values stored in the first lidar dataset.

13. The method of claim 9, wherein the spectrum of wavelengths corresponds to an absorption feature for the gas of interest, and the gas of interest is methane ($CH_4$).

14. A lidar system, comprising:

a diode laser, driven by a drive current;

a modulator;

a detector; and a processor, the processor having associated non-transitory memory programmed with instructions that allow the system to:

change the drive current of the diode laser to produce laser light over a spectrum of wavelengths, wherein points in time have a relationship to the drive current and the spectrum of wavelengths;

direct the modulator to modulate the laser light with a pattern of pulses;

transmit the modulated laser light at a plurality of angles into a scene;

for each of the plurality of angles, (i) detect returning laser light scattered from scattering points in the scene over a time interval T, (ii) estimate a corresponding distance d to the scattering points in the scene, and (iii) estimate a corresponding concentration path length (CPL) value for a gas of interest;

store data corresponding to each angle, of the plurality of angles, along with corresponding estimated distance and the corresponding estimated CPL value in a first lidar dataset;

calculate, based on the stored data in the first lidar dataset, an ambient gas concentration ($C_{ambient}$); and generate a revised lidar dataset, comprising revised CPL values based on the calculated ambient gas concentration ($C_{ambient}$);

wherein the estimating of the corresponding distance d to the scattering points in the scene additionally comprises:

for each modulation pulse during the time interval T, generating an intensity histogram based on signals from the detector that correspond to portions of the time interval T, with each intensity histogram having a number of time bins, each time bin (i) representing a distinct time within the histogram, (ii) having an index i, and (iii) having intensity values $I_i$ associated with the index i;

combining data for intensity histograms collected during the time interval T into a grouped histogram with a grouped intensity signal $I_i(\tau_i)$ for each ith time bin;

computing a time $t_{scene}$ for the grouped histogram from time bins corresponding to the detected returning laser light scattered from scattering points in the scene; and computing the distance d corresponding to the time $t_{scene}$.

15. The lidar system of claim 14, additionally comprising a display configured to present the revised CPL values in the revised CPL dataset in a two-dimensional (x,y) image format, wherein each (x,y) point in the image corresponds to a revised CPL value for a corresponding angle.

16. The lidar system of claim 14, wherein the gas of interest is methane ($CH_4$).

17. The lidar system of claim 14, additionally comprising control electronics configured to:

provide the pattern of pulses; and provide a signal to initiate data collection in an intensity histogram, the signal correlated with a pulse from the pattern of pulses used to modulate the laser light.

18. The lidar system of claim 17, wherein:

the non-transitory memory is additionally programmed with instructions that allow the system to:

determine a time value $t_0$ that corresponds to the signal from the control electronics;

compute a time $t_{scene}$ corresponding to the detected returning laser light scattered from scattering points in the scene; and wherein estimating the corresponding distance d uses $$d = \frac{c(t_{scene} = t_o)}{2},$$

where c is the speed of light.

19. The lidar system of claim 14, wherein:

the non-transient memory is additionally programmed with instructions that allow the system to detect laser light scattered internally within the lidar system, wherein the laser light scattered internally within the lidar system is scattered from a beamsplitter; and the detector is positioned to detect both:

the laser light scattered internally within the lidar system and the returning laser light scattered from scattering points in the scene.

20. The lidar system of claim 14, additionally comprising:

an alarm mechanism to transmit an alarm when one or more revised CPL values exceed a predetermined threshold.

* * * * *